| (12) United States Patent<br>Yang et al. | (10) Patent No.: US 7,916,108 B2<br>(45) Date of Patent: Mar. 29, 2011 |
|---|---|

(54) LIQUID CRYSTAL DISPLAY PANEL WITH COLOR WASHOUT IMPROVEMENT AND APPLICATIONS OF SAME

(75) Inventors: Chen-Kuo Yang, Hsinchu (TW); Chien-Hua Chen, Hsinchu (TW); Chih-Yuan Chien, Hsinchu (TW); Hsueh-Ying Huang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 520 days.

(21) Appl. No.: 12/106,599

(22) Filed: Apr. 21, 2008

(65) Prior Publication Data

US 2009/0262056 A1 Oct. 22, 2009

(51) Int. Cl.
*G09G 3/36* (2006.01)
(52) U.S. Cl. .................. 345/89; 345/88; 345/93
(58) Field of Classification Search ............ 345/87–100, 345/204–215, 690
See application file for complete search history.

(56) References Cited

U.S. PATENT DOCUMENTS

| 5,151,805 | A | * | 9/1992 | Takeda et al. ............... 345/94 |
| 5,296,847 | A | * | 3/1994 | Takeda et al. ............... 345/92 |
| 2004/0160405 | A1 | * | 8/2004 | Lin et al. ..................... 345/98 |
| 2006/0180813 | A1 | | 8/2006 | Kim et al. |
| 2007/0126944 | A1 | | 6/2007 | Kim et al. |

* cited by examiner

*Primary Examiner* — Vijay Shankar
(74) *Attorney, Agent, or Firm* — Tim Tingkang Xia; Morris, Manning & Martin, LLP

(57) ABSTRACT

A liquid crystal display (LCD) panel with color washout improvement. In one embodiment, the LCD panel a plurality of pixels, $\{P_{n,m}\}$, spatially arranged in the form of a matrix, n=1, 2, ..., N, and m=1, 2, ..., M, and N, M being an integer greater than zero, each pixel $P_{n,m}$ comprising at least a first sub-pixel, $P_{n,m}(1)$, having a sub-pixel electrode and a second sub-pixel, $P_{n,m}(2)$, having a sub-pixel electrode. The plurality of pixels, $\{P_{n,m}\}$, is configured such that when a gray level voltage associated with a gray level, g, of an image to be displayed on a pixel is applied to the pixel $P_{n,m}$, a potential difference, $\Delta V_{12}(g)$, is generated in the sub-pixel electrodes of the first and second sub-pixels of the pixel $P_{n,m}$. The potential difference, $\Delta V_{12}(g)$, varies with the gray level g of the image to be displayed on the pixel, where g=0, 1, 2, ..., R corresponding to one of the shades of grey of the image expressed in h bits, h being an integer greater than zero and $R=(2^h-1)$.

25 Claims, 11 Drawing Sheets

LIQUID CRYSTAL DISPLAY PANEL WITH COLOR WASHOUT IMPROVEMENT AND APPLICATIONS OF SAME

FIELD OF THE INVENTION

The present invention relates generally to a liquid crystal display (LCD), and more particularly to an LCD apparatus having an LCD panel with color washout improvement.

BACKGROUND OF THE INVENTION

Liquid crystal displays (LCDs) are commonly used as a display device because of its capability of displaying images with good quality while using little electrical power. An LCD apparatus includes an LCD panel formed with liquid crystal cells and pixel elements with each associating with a corresponding liquid crystal cell and having a liquid crystal (LC) capacitor and a storage capacitor, a thin film transistor (TFT) electrically coupled with the liquid crystal capacitor and the storage capacitor. These pixel elements are substantially arranged in the form of a matrix having a number of pixel rows and a number of pixel columns. Typically, scanning signals are sequentially applied to the number of pixel rows for sequentially turning on the pixel elements row-by-row. When a scanning signal is applied to a pixel row to turn on corresponding TFTs of the pixel elements of a pixel row, source signals (image signals) for the pixel row are simultaneously applied to the number of pixel columns so as to charge the corresponding liquid crystal capacitor and storage capacitor of the pixel row for aligning orientations of the corresponding liquid crystal cells associated with the pixel row to control light transmittance therethrough. By repeating the procedure for all pixel rows, all pixel elements are supplied with corresponding source signals of the image signal, thereby displaying the image signal thereon.

Liquid crystal molecules have a definite orientational alignment as a result of their long, thin shapes. The orientations of liquid crystal molecules in liquid crystal cells of an LCD panel play a crucial role in the transmittance of light therethrough. For example, in a twist nematic LCD, when the liquid crystal molecules are in its tilted orientation, light from the direction of incidence is subject to various different indexes of reflection. Since the functionality of LCDs is based on the birefringence effect, the transmittance of light will vary with different viewing angles. Due to such differences in light transmission, optimum viewing of an LCD is limited within a narrow viewing angle. The limited viewing angle of LCDs is one of the major disadvantages associated with the LCDs and is a major factor in restricting applications of the LCDs.

Several approaches exist for increasing the viewing angles of LCDs, such as in-plane switching (IPS) mode, and multi-domain vertical alignments. IPS mode uses comb-like inter-digitized electrodes to apply electrical fields in the plane of the substrates, thereby aligning the liquid crystal molecules along the substrates and providing wide viewing angles for use in wide viewing angle monitors or other applications. However, although IPS provides wide viewing angles, it requires high voltages and has low aperture ratios. In addition, due to the planar electric field structure, IPS mode inherently suffers from severe image sticking. A multi-domain arrangement is achieved by introducing a protruding structure that forces the liquid crystal molecules to tilt in different directions. However, such a multi-domain vertical alignment requires an extra photolithography step during fabrication.

Therefore, a heretofore unaddressed need exists in the art to address the aforementioned deficiencies and inadequacies.

SUMMARY OF THE INVENTION

The present invention, in one aspect, relates to an LCD panel with color washout improvement. In one embodiment, the LCD panel includes a common electrode; a plurality of scanning lines, $\{G_n\}$, $n=1, 2, \ldots, N$, spatially arranged along a row direction; a plurality of data lines, $\{D_m\}$, $m=1, 2, \ldots, M$, spatially arranged crossing the plurality of scanning lines $\{G_n\}$ along a column direction perpendicular to the row direction; and a plurality of pixels, $\{P_{n,m}\}$, spatially arranged in the form of a matrix, each pixel $P_{n,m}$ defined between two neighboring scanning lines $G_n$ and $G_{n+1}$ and two neighboring data lines $D_m$ and $D_{m+1}$. Each pixel $P_{n,m}$ comprises at least a first sub-pixel, $P_{n,m}(1)$, and a second sub-pixel, $P_{n,m}(2)$. Each of the first sub-pixel $P_{n,m}(1)$ and the second sub-pixel $P_{n,m}(2)$ comprises a sub-pixel electrode, a liquid crystal (LC) capacitor and a storage capacitor both electrically connected between the sub-pixel electrode and the common electrode in parallel, and a transistor having a gate electrically connected to the scanning line $G_n$, a source electrically connected to the sub-pixel electrode and a drain.

In one embodiment, the drain of the transistor of the first sub-pixel $P_{n,m}(1)$ of the pixel $P_{n,m}$ is electrically connected to the data line $D_m$, and the drain of the transistor of the second sub-pixel $P_{n,m}(2)$ of the pixel $P_{n,m}$ is electrically connected to the sub-pixel electrode of the first sub-pixel $P_{k,m}(1)$ of the pixel $P_{k,m}$, where $k=1, 2, \ldots, N$, and $k \neq n$. For example, $k=n+1$ or $n-1$.

In another embodiment, the drain of the transistor of the second sub-pixel $P_{n,m}(2)$ of the pixel $P_{n,m}$ is electrically connected to the data line $D_m$, and the drain of the transistor of the first sub-pixel $P_{n,m}(1)$ of the pixel $P_{n,m}$ is electrically connected to the sub-pixel electrode of the second sub-pixel $P_{k,m}(2)$ of the pixel $P_{k,m}$, where $k=1, 2, \ldots N$, and $k \neq n$. In one embodiment, $k=n+1$ or $n-1$.

In one embodiment, the sub-pixel electrode of the first sub-pixel $P_{n,m}(1)$ of the pixel $P_{n,m}$ has an area A1, and the sub-pixel electrode of the second sub-pixel $P_{n,m}(2)$ of the pixel $P_{n,m}$ has an area A2, and the ratio of A1/A2 is in a range of about 0.2-5.0.

For such an LCD panel, when a scanning signal is applied to a scanning line $G_n$ to turn on the corresponding transistors connected to the scanning line $G_n$, a plurality of data signals is simultaneously applied to the plurality of data lines $\{D_n\}$, respectively, so as to charge the corresponding LC capacitors and storage capacitors of each pixel of the corresponding pixel row for aligning states of corresponding liquid crystal cells associated with the pixel row to control light transmittance therethrough.

The plurality of data signals comprises a plurality of gray level voltages, each gray level voltage being associated with a gray level, g, of an image to be displayed on a pixel in the pixel row such that when the gray level voltage is applied the pixel, a potential difference, $\Delta V_{12}(g)$, is generated in the sub-pixel electrodes of the first and second sub-pixels of the pixel, which varies with the gray level g of the image to be displayed on the pixel, where $g=0, 1, 2, \ldots, R$ corresponding to one of the shades of grey of the image expressed in h bits, h being an integer greater than zero and $R=(2^h-1)$.

In one embodiment, the potential difference $\Delta V_{12}(g)$ generated in the sub-pixel electrodes of the first and second sub-pixels of a pixel varies with the gray level g, such that (i) when the gray level g is in the range from 0 to $g_a$, the potential difference $\Delta V_{12}(g)$ for the gray level g is less than the potential difference $\Delta V_{12}(g+1)$ for the gray level (g+1); and (ii) when the gray level g is in the range from $g_b$ to R, the potential difference $\Delta V_{12}(g)$ for the gray level g is greater than the potential difference $\Delta V_{12}(g+1)$ for the gray level (g+1), where $0<g_a \leqq g_b <R$, $g_a$ and $g_b$ each being an integer greater than zero.

In another embodiment, the potential difference $\Delta V_{12}(g)$ varies with the gray level g, such that (i) when the gray level g is in the range from 0 to $g_a$, the potential difference $\Delta V_{12}(g)$ for the gray level g has a constant voltage, $V_c$; (ii) when the gray level g is in the range from $g_a$ to $g_b$, the potential difference $\Delta V_{12}(g)$ for the gray level g has a constant voltage, $V_b$; and (iii) when the gray level g is in the range from $g_b$ to R, the potential difference $\Delta V_{12}(g)$ for the gray level g has a constant voltage, $V_c$, where $V_a > V_b > V_c$.

In another aspect, the present invention relates to a method of driving a liquid crystal display (LCD) with color washout improvement. In one embodiment, the method includes the step of providing an LCD panel. The LCD panel has a common electrode; a plurality of scanning lines, $\{G_n\}$, n=1, 2, . . . , N, spatially arranged along a row direction; a plurality of data lines, $\{D_m\}$, m=1, 2, . . . , M, spatially arranged crossing the plurality of scanning lines $\{G_n\}$ along a column direction perpendicular to the row direction; and a plurality of pixels, $\{P_{n,m}\}$, spatially arranged in the form of a matrix. Each pixel $P_{n,m}$ is defined between two neighboring scanning lines $G_n$ and $G_{n+1}$ and two neighboring data lines $D_m$ and $D_{m+1}$. Each pixel $P_{n,m}$ includes at least a first sub-pixel, $P_{n,m}(1)$, and a second sub-pixel, $P_{n,m}(2)$, where each of the first sub-pixel $P_{n,m}(1)$ and the second sub-pixel $P_{n,m}(2)$ comprises a sub-pixel electrode, a liquid crystal (LC) capacitor and a storage capacitor both electrically connected between the sub-pixel electrode and the common electrode in parallel, and a transistor having a gate electrically connected to the scanning line $G_n$, a source electrically connected to the sub-pixel electrode and a drain.

In one embodiment, the drain of the transistor of the first sub-pixel $P_{n,m}(a)$ of the pixel $P_{n,m}$ is electrically connected to the data line $D_m$, and the drain of the transistor of the second sub-pixel $P_{n,m}(2)$ of the pixel $P_{n,m}$ is electrically connected to the sub-pixel electrode of the first sub-pixel $P_{k,m}(1)$ of the pixel $P_{k,m}$. In another embodiment, the drain of the transistor of the second sub-pixel $P_{n,m}(2)$ of the pixel $P_{n,m}$ is electrically connected to the data line $D_m$, and the drain of the transistor of the first sub-pixel $P_{n,m}(1)$ of the pixel $P_{n,m}$ is electrically connected to the sub-pixel electrode of the second sub-pixel $P_{k,m}(2)$ of the pixel $P_{k,m}$, where k=1, 2, . . . , N, and k≠n.

Furthermore, the method includes the steps of generating the plurality of driving signals; and applying a plurality of driving signals to the LCD panel so as to generate a potential difference, $\Delta V_{12}(g)$, in the sub-pixel electrodes of the first and second sub-pixels of each pixel, respectively. In one embodiment, the plurality of driving signals comprises a plurality of scanning signals sequentially applied to the plurality of scanning lines, a plurality of data signals simultaneously applied to the plurality of data lines, and a common signal applied to the common electrode, respectively.

In one embodiment, the plurality of data signals comprises a plurality of gray level voltages. Each gray level voltage is associated with a gray level, g, of an image to be displayed on a pixel in the pixel row. When the gray level voltage is applied the pixel, the potential difference $\Delta V_{12}(g)$ generated in the sub-pixel electrodes of the first and second sub-pixels of the pixel varies with the gray level g of the image to be displayed on the pixel, where g=0, 1, 2, . . . , R corresponding to one of the shades of grey of the image expressed in h bits, h being an integer greater than zero and $R=(2^h-1)$.

In one embodiment, the potential difference $\Delta V_{12}(g)$ generated in the sub-pixel electrodes of the first and second sub-pixels of a pixel varies with the gray level g, such that (i) when the gray level g is in the range from 0 to $g_a$, the potential difference $\Delta V_{12}(g)$ for the gray level g is less than the potential difference $\Delta V_{12}(g+1)$ for the gray level (g+1); and (ii) when the gray level g is in the range from $g_b$ to R, the potential difference $\Delta V_{12}(g)$ for the gray level g is greater than the potential difference $\Delta V_{12}(g+1)$ for the gray level (g+1), where $0<g_a \leqq g_b <R$, $g_a$ and $g_b$ each being an integer greater than zero.

In another embodiment, the potential difference $\Delta V_{12}(g)$ varies with the gray level g, such that (i) when the gray level g is in the range from 0 to $g_a$, the potential difference $\Delta V_{12}(g)$ for the gray level g has a constant voltage, $V_a$; (ii) when the gray level g is in the range from $g_a$ to $g_b$, the potential difference $\Delta V_{12}(g)$ for the gray level g has a constant voltage, $V_b$; and (iii) when the gray level g is in the range from $g_b$ to R, the potential difference $\Delta V_{12}(g)$ for the gray level g has a constant voltage, $V_c$, where $V_a > V_b > V_c$.

In yet another aspect, the present invention relates to an LCD panel. In one embodiment, the LCD panel has a plurality of pixels, $\{P_{n,m}\}$, spatially arranged in the form of a matrix, n=1, 2, . . . , N, and m=1, 2, . . . , M, and N, M being an integer greater than zero, each pixel $P_{n,m}$ comprising at least a first sub-pixel, $P_{n,m}(1)$, having a sub-pixel electrode, and a second sub-pixel, $P_{n,m}(2)$, having a sub-pixel electrode.

In one embodiment, the plurality of pixels $\{P_{n,m}\}$ is configured such that when a gray level voltage associated with a gray level, g, of an image to be displayed on a pixel $P_{n,m}$ is applied to the pixel $P_{n,m}$, a potential difference, $\Delta V_{12}(g)$, is generated in the sub-pixel electrodes of the first and second sub-pixels of the pixel $P_{n,m}$, and varies with the gray level g, such that (i) when the gray level g is in the range from 0 to $g_a$, the potential difference $\Delta V_{12}(g)$ for the gray level g is less than the potential difference $\Delta V_{12}(g+1)$ for the gray level (g+1); and (ii) when the gray level g is in the range from $g_b$ to R, the potential difference $\Delta V_{12}(g)$ for the gray level g is greater than the potential difference $\Delta V_{12}(g+1)$ for the gray level (g+1). g=0, 1, 2, . . . , R corresponding to one of the shades of grey of the image expressed in h bits, h is an integer greater than zero and $R=(2^h-1)$. Additionally, $0<g_a \leqq g_b <R$, $g_a$ and $g_b$ each being an integer greater than zero.

The LCD panel also has a common electrode; a plurality of scanning lines, $\{G_n\}$, n=1, 2, . . . , N, spatially arranged along a row direction; and a plurality of data lines, $\{D_m\}$, m=1, 2, . . . , M, spatially arranged crossing the plurality of scanning lines $\{G_n\}$ along a column direction perpendicular to the row direction, where each pixel $P_{n,m}$ of the the plurality of pixels $\{P_{n,m}\}$ is defined between two neighboring scanning lines $G_n$ and $G_{n+1}$ and two neighboring data lines $D_m$ and $D_{m+1}$.

In one embodiment, each of the first sub-pixel $P_{n,m}(1)$ and the second sub-pixel $P_{n,m}(2)$ of each pixel $P_{n,m}$ further comprises a liquid crystal (LC) capacitor and a storage capacitor both electrically connected between the sub-pixel electrode and the common electrode in parallel, and a transistor having a gate electrically connected to the scanning line $G_n$, a source electrically connected to the sub-pixel electrode and a drain. In one embodiment, the drain of the transistor of the first sub-pixel $P_{n,m}(a)$ of the pixel $P_{n,m}$ is electrically connected to the data line $D_m$, and the drain of the transistor of the second sub-pixel $P_{n,m}(2)$ of the pixel $P_{n,m}$ is electrically connected to the sub-pixel electrode of the first sub-pixel $P_{k,m}(1)$ of the pixel $P_{k,m}$. In another embodiment, the drain of the transistor of the second sub-pixel $P_{n,m}(2)$ of the pixel $P_{n,m}$ is electrically connected to the data line $D_m$, and the drain of the transistor of the first sub-pixel $P_{n,m}(1)$ of the pixel $P_{n,m}$ is electrically connected to the sub-pixel electrode of the second sub-pixel $P_{k,m}(2)$ of the pixel $P_{k,m}$. k=1, 2, ..., N, and k≠n.

In a further aspect, the present invention relates to an LCD panel. In one embodiment, the LCD panel includes a plurality of pixels, $\{P_{n,m}\}$, spatially arranged in the form of a matrix, n=1, 2, ..., N, and m=1, 2, ..., M, and N, M being an integer greater than zero, each pixel $P_{n,m}$ comprising at least a first sub-pixel, $P_{n,m}(1)$, having a sub-pixel electrode, and a second sub-pixel, $P_{n,m}(2)$, having a sub-pixel electrode. The plurality of pixels $\{P_{n,m}\}$ is configured such that when a gray level voltage associated with a gray level, g, of an image to be displayed on a pixel is applied to the pixel $P_{n,m}$, a potential difference, $\Delta V_{12}(g)$, is generated in the sub-pixel electrodes of the first and second sub-pixels of the pixel $P_{n,m}$, and varies with the gray level g, such that (i) when the gray level g is in the range from 0 to $g_3$, the potential difference $\Delta V_{12}(g)$ for the gray level g has a constant voltage, $V_3$; (ii) when the gray level g is in the range from $g_3$ to $g_{ba}$, the potential difference $\Delta V_{12}(g)$ for the gray level g has a constant voltage, $V_b$; and (iii) when the gray level g is in the range from $g_b$ to R, the potential difference $\Delta V_{12}(g)$ for the gray level g has a constant voltage, $V_c$. g=0, 1, 2, ..., R corresponding to one of the shades of grey of the image expressed in h bits, h is an integer greater than zero and $R=(2^h-1)$. Additionally, $0<g_a \leq g_b<R$, $g_a$ and $g_b$ each being an integer greater than zero, and $V_a>V_b>V_c$.

In yet a further aspect, the present invention relates to an LCD panel. In one embodiment, the LCD panel includes a plurality of pixels, $\{P_{n,m}\}$, spatially arranged in the form of a matrix, n=1, 2, ..., N, and m=1, 2, ..., M, and N, M being an integer greater than zero, each pixel $P_{n,m}$ comprising at least a first sub-pixel, $P_{n,m}(1)$, having a sub-pixel electrode and a second sub-pixel, $P_{n,m}(2)$, having a sub-pixel electrode. In one embodiment, the plurality of pixels, $\{P_{n,m}\}$, is configured such that when a gray level voltage associated with a gray level, g, of an image to be displayed on a pixel is applied to the pixel $P_{n,m}$, a potential difference, $\Delta V_{12}(g)$, is generated in the sub-pixel electrodes of the first and second sub-pixels of the pixel $P_{n,m}$, which varies with the gray level g of the image to be displayed on the pixel, where g=0, 1, 2, ..., R corresponding to one of the shades of grey of the image expressed in h bits, h being an integer greater than zero and $R=(2^h-1)$.

In one embodiment, the potential difference $\Delta V_{12}(g)$ generated in the sub-pixel electrodes of the first and second sub-pixels of the pixel satisfies the following relationships of:
 (1). when $0 \leq g \leq g_a$, $\Delta V_{12}(g) < \Delta V_{12}(g+1)$; and
 (2). when $g_b \leq g \leq R$, $\Delta V_{12}(g) > \Delta V_{12}(g+1)$,
where $0<g_a \leq g_b<R$, $g_a$ and $g_b$ each being an integer greater than zero.

In another embodiment, the potential difference $\Delta V_{12}(g)$ satisfies the following relationships of:
 (i). when $0 \leq g \leq g_a$, $\Delta V_{12}(g)=V_a$;
 (ii). when $g_a \leq g \leq g_b$, $\Delta V_{12}(g)=V_b$; and
 (iii). when $g_b \leq g \leq R$, $\Delta V_{12}(g)=V_c$,
where $0<g_a \leq g_b<R$, $g_a$ and $g_b$ each being an integer greater than zero, and $V_a$, $V_b$ and $V_c$ are constant voltages with $V_a>V_b>V_c$.

In one aspect, the present invention relates to a method of driving a liquid crystal display (LCD) with color washout improvement. In one embodiment, the method includes the steps of providing an LCD panel comprising a plurality of pixels, $\{P_{n,m}\}$, spatially arranged in the form of a matrix, n=1, 2, ..., N, and m=1, 2, ..., M, and N, M being an integer greater than zero, each pixel $P_{n,m}$ comprising at least a first sub-pixel, $P_{n,m}(1)$, having a sub-pixel electrode, and a second sub-pixel, $P_{n,m}(2)$, having a sub-pixel electrode; and applying a plurality of driving signals to the LCD panel so as to generate potential difference, $\Delta V_{12}(g)$, in the sub-pixel electrodes of the first and second sub-pixels of each pixel, respectively, which varies with a gray level g of an image to be displayed on the pixel, where g=0, 1, 2, ..., R corresponding to one of the shades of grey of the image expressed in h bits, h being an integer greater than zero and $R=(2^h-1)$.

In one embodiment, the potential difference $\Delta V_{12}(g)$ generated in the sub-pixel electrodes of the first and second sub-pixels of the pixel satisfies the following relationships of:
 (1). when $0 \leq g \leq g_a$, $\Delta V_{12}(g) < \Delta V_{12}(g+1)$; and
 (2). when $g_b \leq g \leq R$, $\Delta V_{12}(g) > \Delta V_{12}(g+1)$,
where $0<g_a \leq g_b<R$, $g_a$ and $g_b$ each being an integer greater than zero.

In another embodiment, the potential difference $\Delta V_{12}(g)$ satisfies the following relationships of:
 (ii). when $0 \leq g \leq g_a$, $\Delta V_{12}(g)=V_a$;
 (iii). when $g_a \leq g \leq g_b$, $\Delta V_{12}(g)=V_b$; and
 (iv). when $g_b \leq g \leq R$, $\Delta V_{12}(g)=V_c$,
where $0<g_a \leq g_b<R$, $g_a$ and $g_b$ each being an integer greater than zero, and $V_a$, $V_b$ and $V_c$ are constant voltages with $V_a>V_b>V_c$.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
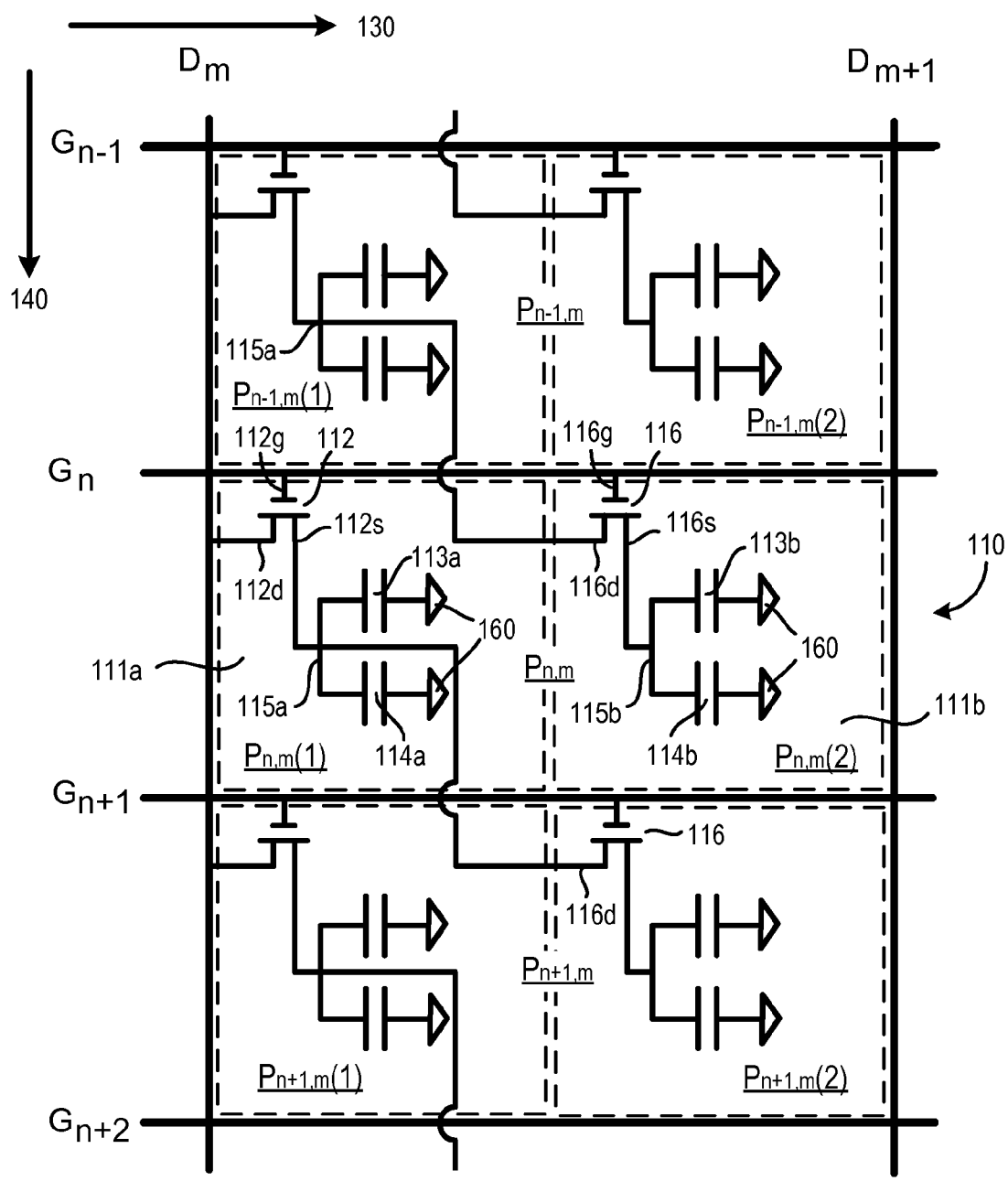
FIG. 1 partially shows schematically an equivalent circuit diagram of an LCD panel according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

As used herein, the terms "gamma" and/or "gamma curve" refer to the characterization of brightness of an imaging display system, for example, an LCD device, versus grey levels (scales). Gamma summarizes, in a single numerical parameter, the nonlinear relationship between grey level and brightness of the imaging display system.

As used herein, the terms "grey level" and "grey scale" are synonyms in the specification and refer to one of (discrete) shades of grey for an image, or an amount of light perceived by a human for the image. If the brightness of the image is expressed in the form of shades of grey in h bits, n being an integer greater than zero, the grey level takes values from zero representing black, up to $(2^h-1)$ representing white, with intermediate values representing increasingly light shades of grey. In an LCD device, the amount of light that transmits through liquid crystals is adjusted to represent the gray level.

As used herein, the term "grey level voltage" or "driving voltage" refers to a voltage generated from a data driver in accordance for driving a particular area or pixel of an LCD panel, in accordance with a grey level of a frame of an image to be displayed at the particular area or pixel of the LCD panel.

The terms "light transmittance/transmission", "brightness" and "luminance", as used herein, are synonym in the specification and refer to the amount of light that passes through a particular area of an LCD panel.

It has been known that the orientations of liquid crystal molecules in liquid crystal cells of an LCD panel play a crucial role in the transmittance of light therethrough. For example, in a twist nematic LCD, when the liquid crystal molecules are in its tilted orientation, light from the direction of incidence is subject to various different indexes of reflection. Since the functionality of LCDs is based on the birefringence effect, the transmittance of light will vary with different viewing angles. Due to such differences in light transmission, optimum viewing of an LCD is limited within a narrow viewing angle. Additionally, at different grey levels, liquid crystals have different response times in an LCD panel. For example, liquid crystals usually have the shortest response time at the grey level 255, for 8-bit data signals for example, compared to that at other grey levels. The difference between the response times at different grey levels may result in deviations of the gamma curves for different grey levels at different areas of the LCD panel.

Therefore, one aspect of the present invention provides methods to overcome the drawbacks of a color sequential LCD device.

The description will be made as to the embodiments of the present invention in conjunction with the accompanying drawings in FIGS. 1-13. In accordance with the purposes of this invention, as embodied and broadly described herein, this invention, in one aspect, relates to an LCD panel with color washout improvement. In one embodiment, the LCD panel includes a plurality of pixels spatially arranged in the form of a matrix. Each pixel includes at least a first sub-pixel having a sub-pixel electrode and a second sub-pixel having a sub-pixel electrode. The plurality of pixels is configured such that when a gray level voltage associated with a gray level, g, of an image to be displayed on a pixel is applied to the pixel, a potential difference is generated in the sub-pixel electrodes of the first and second sub-pixels of the pixel, which varies with the gray level g of the image to be displayed on the pixel, where $g=0, 1, 2, \ldots, (2^h-1)$ corresponding to one of the shades of grey of the image expressed in h bits, h being an integer greater than zero. That is the potential difference in the sub-pixel electrodes of the first and second sub-pixels of the pixel that results in different alignments of the LC molecules in the first and second sub-pixels of the pixel, thereby improving color washout of the LCD panel.

Referring to FIG. 1, an LCD panel according to one embodiment of the present invention is partially and schematically shown. The LCD panel 100 includes a common electrode 160, a plurality of scanning lines, $G_1, G_2, \ldots, G_{n-1}, G_n, G_{n+1}, \ldots, G_N$, that are spatially arranged along a row (scanning) direction 130, and a plurality of data lines, $D_1, D_2, \ldots, D_{m-1}, D_m, D_{m+1}, \ldots, D_M$, that are spatially arranged crossing the plurality of scanning lines $G_1, G_2, \ldots, G_{n-1}, G_n, G_{n+1}, \ldots, G_N$ along a column direction 140 that is perpendicular to the row direction 130. N and M are integers greater than one. The LCD panel 100 further has a plurality of pixels, $\{P_{n,m}\}$, 110 that are spatially arranged in the form of a matrix. Each pixel $P_{n,m}$ 110 is defined between two neighboring scanning lines $G_n$ and $G_{n+1}$ and two neighboring data lines $D_m$ and $D_{m+1}$. For the purpose of illustration of embodiments of the present invention, FIG. 1 schematically shows only four scanning lines $G_{n-1}$, $G_n$, $G_{n+1}$ and $G_{n+2}$, two data lines $D_m$ and $D_{m+1}$, and three corresponding pixels of the LCD panel 100.

Furthermore, each pixel $P_{n,m}$ 110 is configured to have two or more sub-pixels. As shown in FIG. 1, a pixel $P_{n,m}$ 110 located, for example, between two neighboring scanning lines $G_n$ and $G_{n+1}$ and two neighboring data lines $D_m$ and $D_{m+1}$ crossing the two neighboring scanning lines $G_n$ and $G_{n+1}$ has a first sub-pixel, $P_{n,m}(1)$, 111a and a second sub-pixel, $P_{n,m}(2)$, 111b. Each of the first sub-pixel $P_{n,m}(1)$ 111a and the second sub-pixel $P_{n,m}(2)$ 111b comprises a sub-pixel electrode 115a/115b, a liquid crystal (LC) capacitor 113a/113b and a storage capacitor 114a/114b, and a transistor 112/116. Each pixel is capable of displaying h bits of image data.

Both the LC capacitor 113a and the storage capacitor 114a of the first sub-pixel $P_{n,m}(1)$ 111a of the pixel $P_{n,m}$ 110 are electrically connected between the sub-pixel electrode 115a of the first sub-pixel $P_{n,m}(1)$ 111a of the pixel $P_{n,m}$ 110 and the common electrode 160 in parallel. The transistor 112 of the first sub-pixel $P_{n,m}(1)$ 111a of the pixel $P_{n,m}$ 110 has a gate 112g electrically connected to the scanning line $G_n$, a source 112s electrically connected to the sub-pixel electrode 115a of the first sub-pixel $P_{n,m}(1)$ 111a of the pixel $P_{n,m}$ 110 and a drain 112d electrically connected to the data line $D_m$. The sub-pixel electrode 115a of the first sub-pixel $P_{n,m}(1)$ 111a of the $P_{n,m}$ 110 is in turn electrically connected to the drain 116d of the transistor 116 of the second sub-pixel $P_{n+1,m}(2)$ of the pixel $P_{n+1,m}$.

Furthermore, both LC capacitor 113b and the storage capacitor 114b of the second sub-pixel $P_{n,m}(2)$ 111b of the pixel $P_{n,m}$ 110 are electrically connected between the sub-pixel electrode 115b of the second sub-pixel $P_{n,m}(2)$ 111b of the pixel $P_{n,m}$ 110 and the common electrode 160 in parallel. The transistor 116 of the second sub-pixel $P_{n,m}(2)$ 111b of the pixel $P_{n,m}$ 110 has a gate 116g electrically connected to the scanning line $G_n$, a source 116s electrically connected to the sub-pixel electrode 115b of the second sub-pixel $P_{n,m}(2)$ 111b of the pixel $P_{n,m}$ 110 and a drain 116d electrically connected to the sub-pixel electrode 115a of the first sub-pixel $P_{n-1,m}(1)$ of the pixel $P_{n-1,m}$.

In one embodiment, the sub-pixel electrodes 115a/115b of the first sub-pixel $P_{n,m}(1)$ 111a and the second sub-pixel $P_{n,m}(2)$ 111b of each pixel $P_{n,m}$ 110 are deposited on a first substrate (not shown), while the common electrode 160 is deposited on a second substrate (not shown) that is spatially apart from the first substrate. The LC molecules are filled into cells between the first and second substrates. Each cell is associated with a pixel $P_{n,m}$ 110 of the LCD panel 100. Voltages (potentials) applied to the sub-pixel electrodes control orientational alignments of the LC molecules in the LC cells associated with the corresponding sub-pixels.

The transistor 112 and the transistor 116 in one embodiment are field-effect TFTs and adapted for activating the first sub-pixel $P_{n,m}(1)$ 111a and the second sub-pixel $P_{n,m}(2)$ 111b, respectively. Other types of transistors may also be utilized to practice the present invention. When the transistor 112 and the transistor 116 are selected to be turned on by a scanning signal applied through the scanning line $G_n$ to which the gate 112g of the transistor 112 and the gate 116g of the transistor 116 are electrically coupled, a data signal applied through the corresponding data line $D_m$ is incorporated into the first sub-pixel $P_{n,m}(1)$ 111a and the second sub-pixel $P_{n,m}(2)$ 111b by means of charging the corresponding LC capacitors 113a and 113b, and storage capacitors 114a and 114b of the first sub-pixel $P_{n,m}(1)$ 111a and the second sub-pixel $P_{n,m}(2)$ 111b, respectively. The charged potentials of the LC capacitors 113a and 113b of the first and second sub-pixels 111a and 111b of the pixel 110 are corresponding to the electrical fields applied to corresponding liquid crystal cells between the first and second substrates. The storage capacitor 114a and the storage capacitor 114b are adapted for providing coupling voltages to the corresponding LC capacitors 113a and 113b, respectively, to compensate for charge leakages therefrom. The storage capacitors 114a and 114b of the first and second sub-pixels 111a and 111b can be identical or different.

In one embodiment, the driving signals include a plurality of scanning signals, a plurality of data signals and a common signal. For such an LCD panel 100 shown in FIG. 1, when a scanning signal is applied to a scanning line $G_n$ to turn on the corresponding transistors 112 and 116 connected to the scanning line $G_n$, a plurality of data signals is simultaneously applied to the plurality of data lines $\{D_n\}$ so as to charge the corresponding LC capacitors 113a and 113b and storage capacitors 114a and 114b of each pixel $P_{n,m}$ 110 of the corresponding pixel row for aligning states of corresponding liquid crystal cells associated with the first and second sub-pixels $P_{n,m}(1)$ 111a and $P_{n,m}(2)$ 111b of the pixel $P_{n,m}$ 110 to control light transmittance therethrough. Accordingly, the voltage, Vp1, generated in the sub-pixel electrode 115a of the first sub-pixel $P_{n,m}(1)$ and the voltage, Vp2, generated in the sub-pixel electrode 115b of the second sub-pixel $P_{n,m}(2)$ of the $P_{n,m}$ are different, due to the coupling between the sub-pixel electrode 115a of the first sub-pixel $P_{n,m}(1)$ of the $P_{n,m}$ to the sub-pixel electrode 115b of the second sub-pixel $P_{n+,m}(2)$ of the $P_{n+1,m}$. In other words, the LC molecules associated with the first sub-pixel $P_{n,m}(1)$ and the second sub-pixel $P_{n,m}(2)$ of the $P_{n,m}$ may be aligned at different orientations responsive to a voltage difference, $\Delta V_{12}=(Vp2-Vp1)$, in the sub-pixel electrode 115a of the first sub-pixel $P_{n,m}(1)$ and the sub-pixel electrode 115b of the second sub-pixel $P_{n,m}(2)$ of the $P_{n,m}$.

Practically, the plurality of data signals includes a plurality of gray level voltages. Each gray level voltage is associated with a gray level, g, of an image to be displayed on a pixel $P_{n,m}$. g=0, 1, 2, ..., R corresponding to one of the shades of grey of the image expressed in h bits, h being an integer greater than zero and $R=(2^h-1)$. When such a gray level voltage is applied the pixel $P_{n,m}$, the potential difference $\Delta V_{12}(g)=(Vp2-Vp1)$ in the sub-pixel electrodes of the first and second sub-pixels of the pixel is generated, and varies with the gray level g. In one embodiment, the potential difference $\Delta V_{12}(g)$ in the sub-pixel electrodes 115a and 115b of the first sub-pixel $P_{n,m}(1)$ and the second sub-pixel $P_{n,m}(2)$ of the pixel $P_{n,m}$ satisfies the following relationships of:

(1). when $0 \leq g \leq g_3$, $\Delta V_{12}(g) < \Delta V_{12}(g+1)$; and
(2). when $g_b \leq g \leq R$, $\Delta V_{12}(g) > \Delta V_{12}(g+1)$, where $0 \leq g \leq g_b < R$, $g_3$ and $g_b$ each being an integer greater than zero.

In another embodiment, the potential difference $\Delta V_{12}(g)$ satisfies the following relationships of:

(i). when $0 \leq g \leq g_3$, $\Delta V_{12}(g) = V_3$;
(ii). when $g_a \leq g \leq g_b$, $\Delta V_{12}(g) = V_b$; and
(iii). when $g_b \leq g \leq R$, $\Delta V_{12}(g) = V_c$, where $0 \leq g \leq g_b \leq R$, $g_3$ and $g_b$ each being an integer greater than zero, and $V_3$, $V_b$ and $V_c$ are constant voltages with $V_3 > V_b > V_c$.

Another aspect of the present invention relates to an LCD panel having a common electrode, a plurality of scanning lines, $G_1, G_2, \ldots, G_{n-1}, G_n, G_{n+1}, \ldots, G_N$, that are spatially arranged along a scanning direction, and a plurality of data lines, $D_1, D_2, \ldots D_{m-1}, D_m, D_{m+1}, \ldots, D_M$, that are spatially arranged crossing the plurality of scanning lines $G_1, G_2, \ldots, G_{n-1}, G_n, G_{n+1}, \ldots, G_N$ along a direction that is perpendicular to the scanning direction, and a plurality of pixels, $\{P_{n,m}\}$, that are spatially arranged in the form of a matrix. N and M are integers greater than one. Each pixel $P_{n,m}$ includes at least a first sub-pixel $P_{n,m}(1)$ and a second sub-pixel $P_{n,m}(2)$. Each of the first sub-pixel $P_{n,m}(1)$ and the second sub-pixel $P_{n,m}(2)$ comprises a sub-pixel electrode, a liquid crystal (LC) capacitor and a storage capacitor both electrically connected between the sub-pixel electrode and the common electrode in parallel, and a transistor having a gate electrically connected to the scanning line $G_n$, a source electrically connected to the sub-pixel electrode and a drain.

In one embodiment, the drain of the transistor of the first sub-pixel $P_{n,m}(1)$ of the pixel $P_{n,m}$ is electrically connected to the data line $D_m$, and the drain of the transistor of the second sub-pixel $P_{n,m}(2)$ of the pixel $P_{n,m}$ is electrically connected to the sub-pixel electrode of the first sub-pixel $P_{k,m}(1)$ of the pixel $P_{k,m}$, where k=1, 2, ..., N, and k≠n. For the exemplary embodiment shown in FIG. 1, k=n−1.

In another embodiment, the drain of the transistor of the second sub-pixel $P_{n,m}(2)$ of the pixel $P_{n,m}$ is electrically connected to the data line $D_m$, and the drain of the transistor of the first sub-pixel $P_{n,m}(1)$ of the pixel $P_{n,m}$ is electrically connected to the sub-pixel electrode of the second sub-pixel $P_{k,m}(2)$ of the pixel $P_{k,m}$, where k=1, 2, N, and k≠n.

Referring to FIGS. 2-5, waveform charts of the driving signals 201 applied to the LCD panel 200 and charging in the corresponding sub-pixel electrodes 215a and 215b of the LCD panel 200 are shown according to one embodiment of the present invention. In the exemplary embodiment, the LCD panel 200 is shown schematically and partially with 3×3 pixels, where the pixels, for example, in the first column of the 3×3 pixel matrix are referenced by $P_{1,1}$, $P_{2,1}$ and $P_{3,1}$, respectively. Each pixel has a first sub-pixel electrode 215a, a second sub-pixel electrode 215b, a first transistor (switching device) 211 and a second transistor (switching device) 216, each transistor 211 or 216 having a gate, a source and a drain. The gates of both the first transistor 211 and the second transistor 216 of each pixel are electrically connected to a corresponding scanning line by which the pixel is defined, such as $G_1$, $G_2$ or $G_3$. The sources of the first transistor 211 and the second transistor 216 of each pixel are electrically connected to the first sub-pixel electrode 215a and the second sub-pixel electrode 215b of the pixel, respectively. The drain of the second transistor 216 of each pixel is electrically connected to a corresponding data line by which the pixel is defined, such as $D_1$ or $D_2$, and the drain of the first transistor 212 of each pixel is electrically connected to the sub-electrode 215b of its next neighboring pixel in the same column of the pixel. For example, the drain of the first transistor 212 of the pixel $P_{1,1}$ is electrically connected to the sub-electrode 215b of the pixel $P_{2,1}$, the drain of the first transistor 212 of the pixel $P_{2,1}$ is electrically connected to the sub-electrode 215b of the pixel $P_{3,1}$, and so on, as shown in FIGS. 2-5.

In the exemplary embodiment, the driving signals 201 include three scanning signals 271, 272 and 273 sequentially applied to the scanning lines $G_1$, $G_2$ and $G_3$, and two data signals 281 and 282 simultaneously applied to the data lines $D_1$ and $D_2$, and a common signal Vcom 290 applied to the common electrode (not shown), respectively. Each of the scanning signals 271, 272 and 273 is configured to have a high voltage potential, Vh, and a low voltage potential, Vl, for effectively turning on and off the corresponding transistors of a corresponding pixel row. The common signal Vcom 290 has a constant potential (voltage). The data signals 281 and 282 are generated according to an image to be displayed on these pixels such that when the data signals 281 and 282 are applied to corresponding pixels, a potential (voltage) difference between the potentials of the first and second electrodes 215a and 215b of a pixel is generated. The potential difference is a function of the grey level for the image to be displayed.

Figure 2:
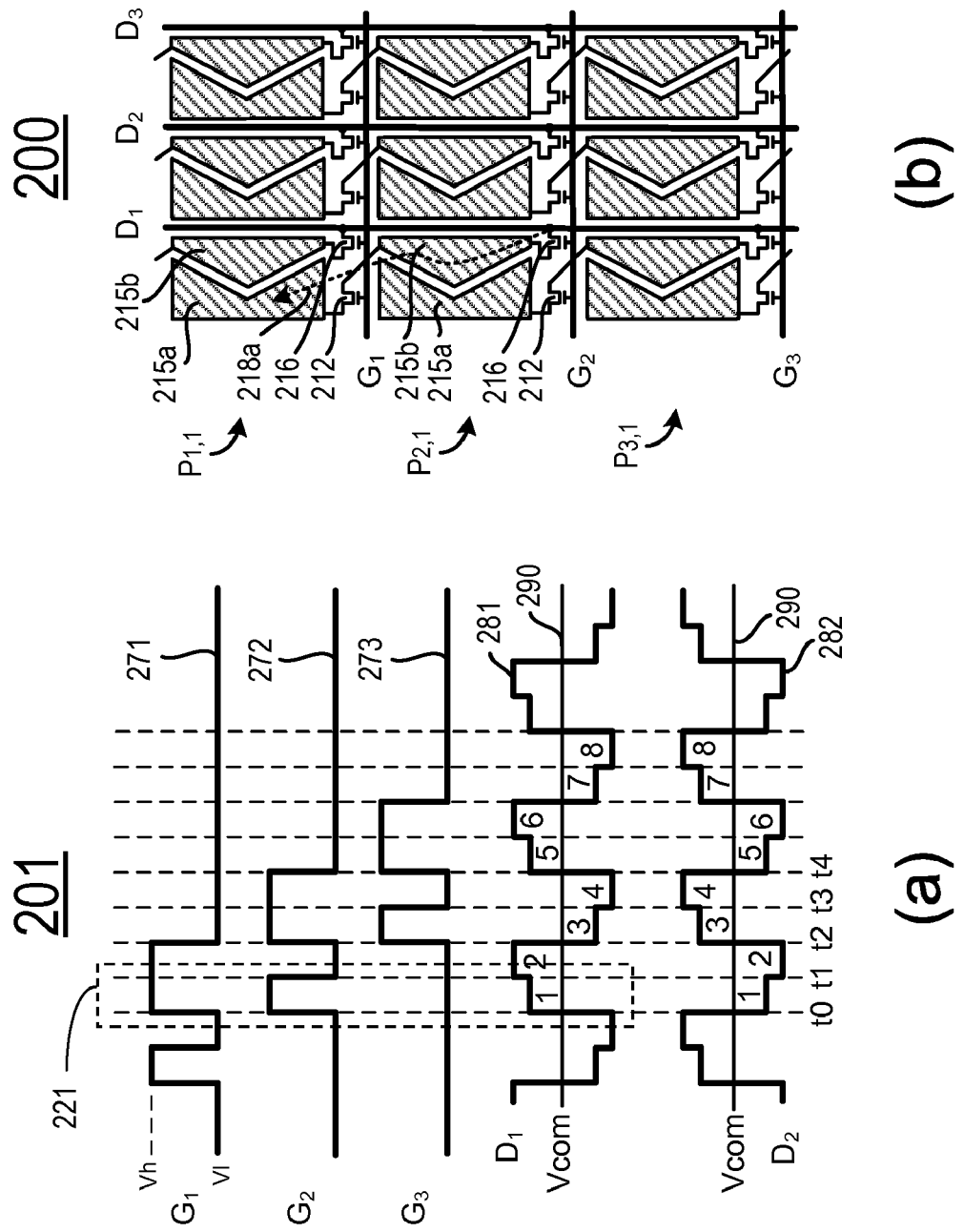
FIG. 2 shows schematically (a) waveform charts of driving signals applied to an LCD panel according to one embodiment of the present invention, and (b) a layout view of the LCD panel, where the transistors electrically connected to the gate lines $G_1$ and $G_2$ are turned on, and the transistors electrically connected to the gate line $G_3$ are turned off, respectively.

As shown in FIG. 2, in the time period 221 of (t1-t0), the transistors 212 and 216 electrically connected to the scanning lines $G_1$ and $G_2$ are turned on, while the transistors 212 and 216 electrically connected to the scanning line $G_2$ are turned off, respectively. Accordingly, a potential (voltage), Vp2, of the second sub-pixel electrode 215b of the pixels $P_1$, and $P_{2,1}$ is generated directly by application of the data signal 281 to the drain of the second transistor 216 of the pixels $P_1$, and $P_{2,1}$, respectively, while a potential (voltage), Vp1, of the first electrode 215a of the pixel $P_{1,1}$ is generated by application of the generated voltage Vp2 of the second sub-pixel electrode 215b of the pixel $P_{2,1}$ to the drain of the first transistor 212 of the pixel $P_{1,1}$. The latter charging process is indicated by arrow 218a. In this case, the voltage difference, $\Delta V12 = Vp2 - Vp1$ is generated in the first and second electrodes 215a and 215b of the pixel $P_{1,1}$.

Figure 3:
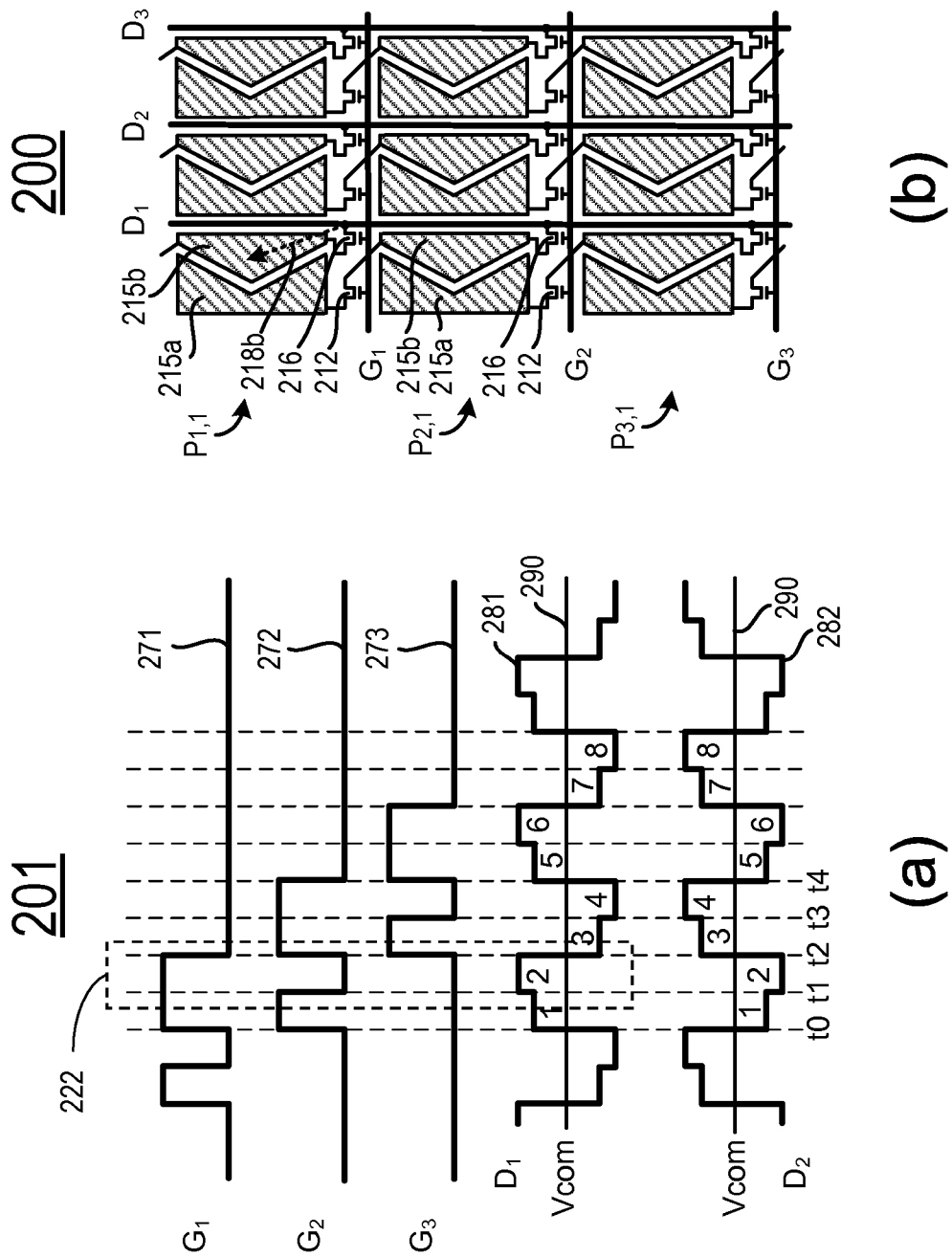
FIG. 3 shows schematically (a) waveform charts of driving signals applied to the LCD panel shown in FIG. 2b, and (b) the layout view of the LCD panel, where the transistors electrically connected to the gate line $G_1$ are turned on, and the transistors electrically connected to the gate lines $G_2$ and $G_3$ are turned off, respectively.

In the time period 222 of (t2-t1), as shown in FIG. 3, the transistors 212 and 216 electrically connected to the scanning line $G_1$ are turned on, while the transistors 212 and 216 electrically connected to the scanning lines $G_2$ and $G_3$ are turned off, respectively. Accordingly, a voltage, Vp2, of the second sub-pixel electrode 215b of the pixel $P_1$, is generated directly by application of the data signal 281 to the drain of the second transistor 216 of the pixel $P_{1,1}$, while no voltage of the first electrode 215a of the pixel $P_1$, is generated since the transistor 216 of the pixel $P_{2,1}$ is turned off. The charging process of the second electrode 215b of the pixel $P_1$, is indicated by arrow 218b. Accordingly, the voltage difference, $\Delta V12$, in the first and second electrodes 215a and 215b of the pixel $P_{1,1}$ is corresponding to Vp2.

Figure 4:
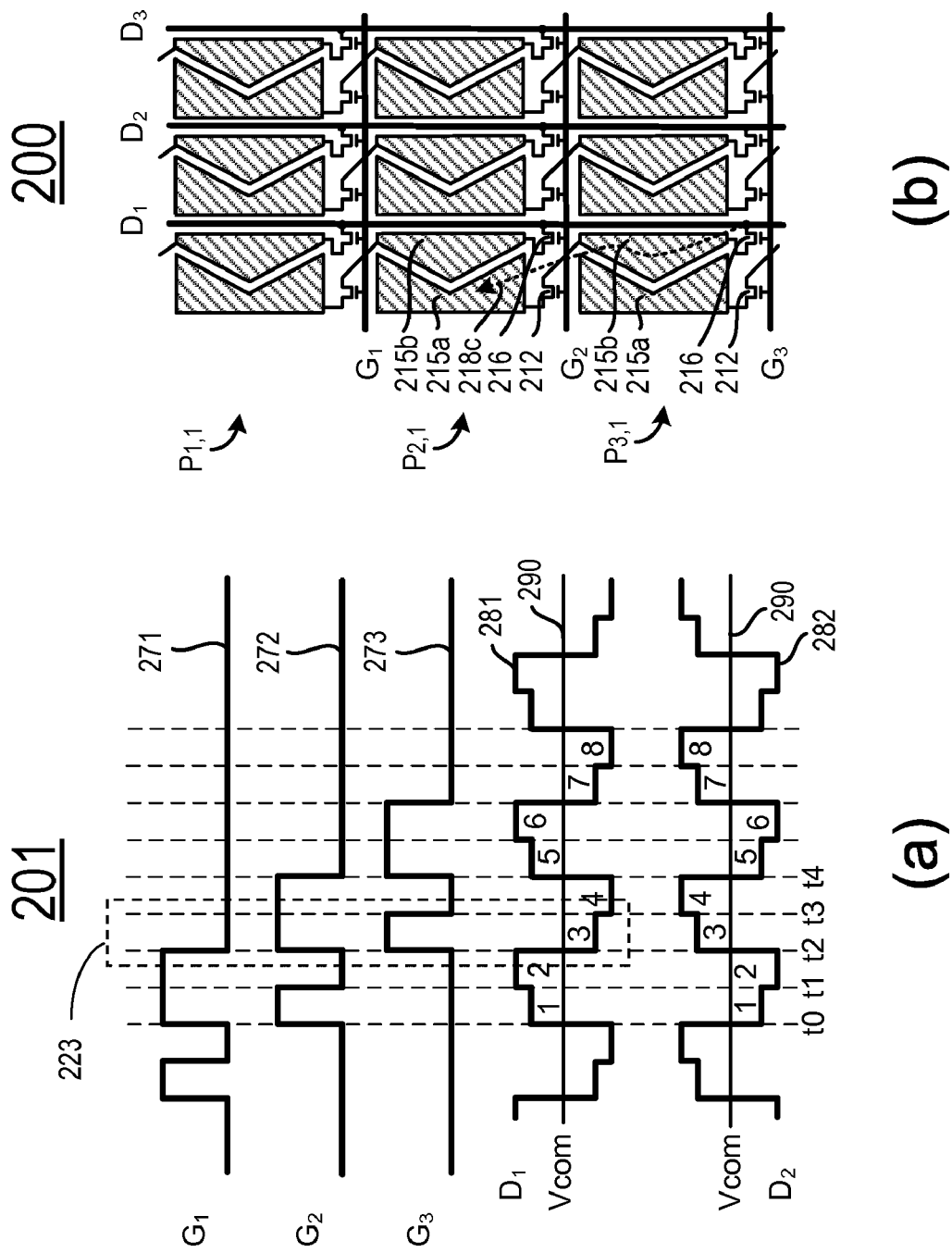
FIG. 4 shows schematically (a) waveform charts of driving signals applied to the LCD panel shown in FIG. 2b, and (b) the layout view of the LCD panel, where the transistors electrically connected to the gate line Glare turned off, and the transistors electrically connected to the gate lines $G_2$ and $G_3$ are turned on, respectively.

As shown in FIG. 4, in the time period 223 of (t3-t2), the transistors 212 and 216 electrically connected to the scanning lines $G_2$ and $G_3$ are turned on, while the transistors 212 and 216 electrically connected to the scanning line $G_1$ are turned off, respectively. Accordingly, a potential (voltage), Vp2, of the second sub-pixel electrode 215b of the pixels $P_{2,1}$ and $P_{3,1}$ is generated directly by application of the data signal 281 to the drain of the second transistor 216 of the pixels $P_{2,1}$ and $P_{3,1}$, respectively, while a potential (voltage), Vp1, of the first electrode 215a of the pixel $P_{2,1}$ is generated by application of the generated voltage Vp2 of the second sub-pixel electrode 215b of the pixel $P_{3,1}$ to the drain of the first transistor 212 of the pixel $P_{2,1}$. The latter charging process is indicated by arrow 218c. In this case, the voltage difference, $\Delta V12$, in the first and second electrodes 215a and 215b of the pixel $P_{2,1}$ is corresponding to (Vp2−Vp1).

Figure 5:
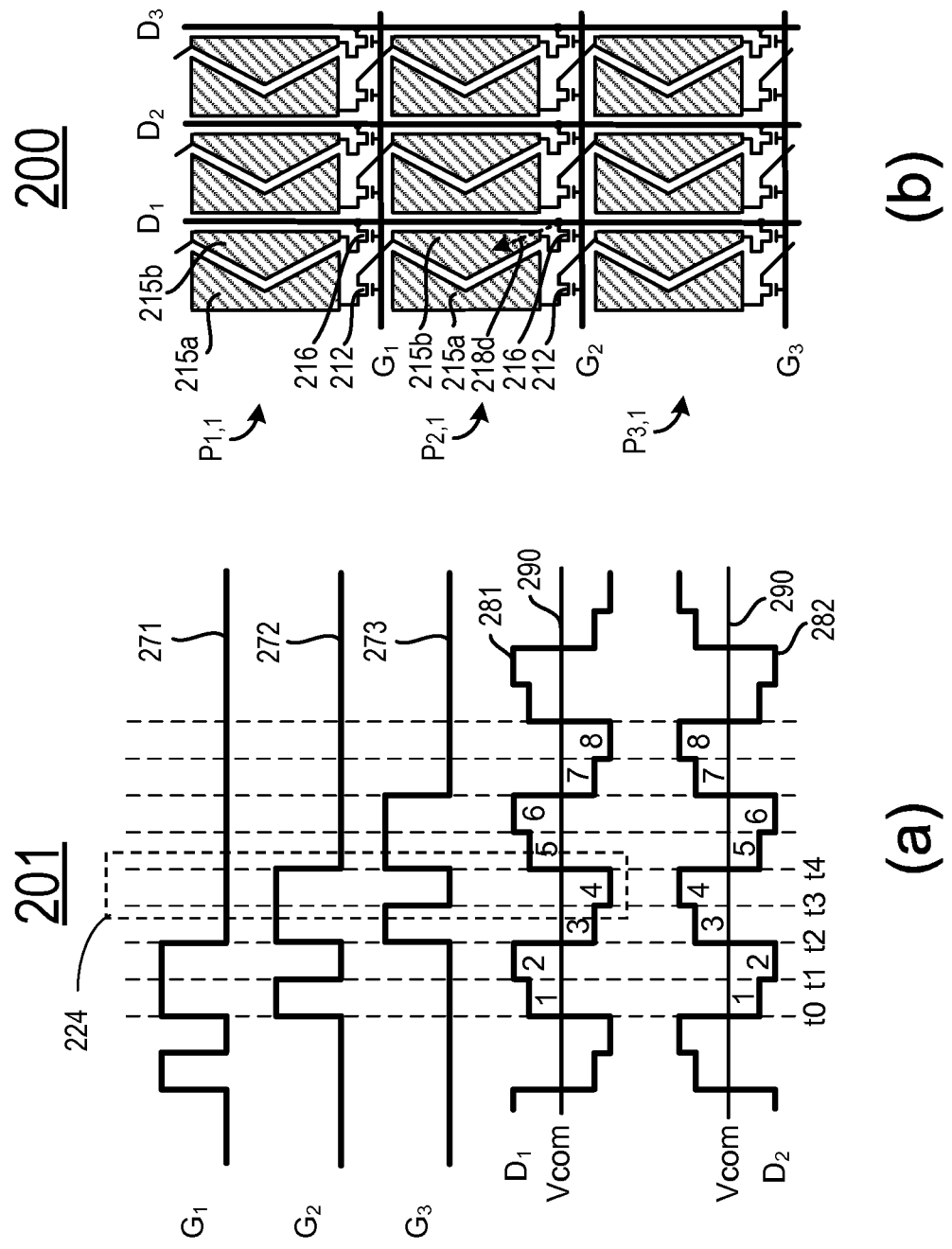
FIG. 5 shows schematically (a) waveform charts of driving signals applied to the LCD panel shown in FIG. 2b, and (b) the layout view of the LCD panel, where the transistors electrically connected to the gate lines $G_1$ and $G_3$ are turned off, and the transistors electrically connected to the gate line $G_2$ are turned on, respectively.

In the time period 224 of (t4-t3), as shown in FIG. 5, the transistors 212 and 216 electrically connected to the scanning line $G_2$ are turned on, while the transistors 212 and 216 electrically connected to the scanning lines $G_1$ and $G_3$ are turned off, respectively. Accordingly, a voltage, Vp2, of the second sub-pixel electrode 215b of the pixel $P_{2,1}$ is generated directly by application of the data signal 281 to the drain of the second transistor 216 of the pixel $P_{2,1}$, while no voltage of the first electrode 215a of the pixel $P_{2,1}$ is generated since the transistor 216 of the pixel $P_{3,1}$ is turned off. The charging process of the second electrode 215b of the pixel $P_{2,1}$ is indicated by arrow 218d. Accordingly, the voltage difference, $\Delta V12$, in the first and second electrodes 215a and 215b of the pixel $P_{2,1}$ is corresponding to Vp2.

In the embodiment as shown in FIGS. 2-5, the first sub-pixel electrode 215a of a pixel has an area A1 and the second sub-pixel electrode 215b of the pixel has an area A2. The ratio of ΔI/A2 is in a range of about 0.2-5.0, in one embodiment.

Figure 6:
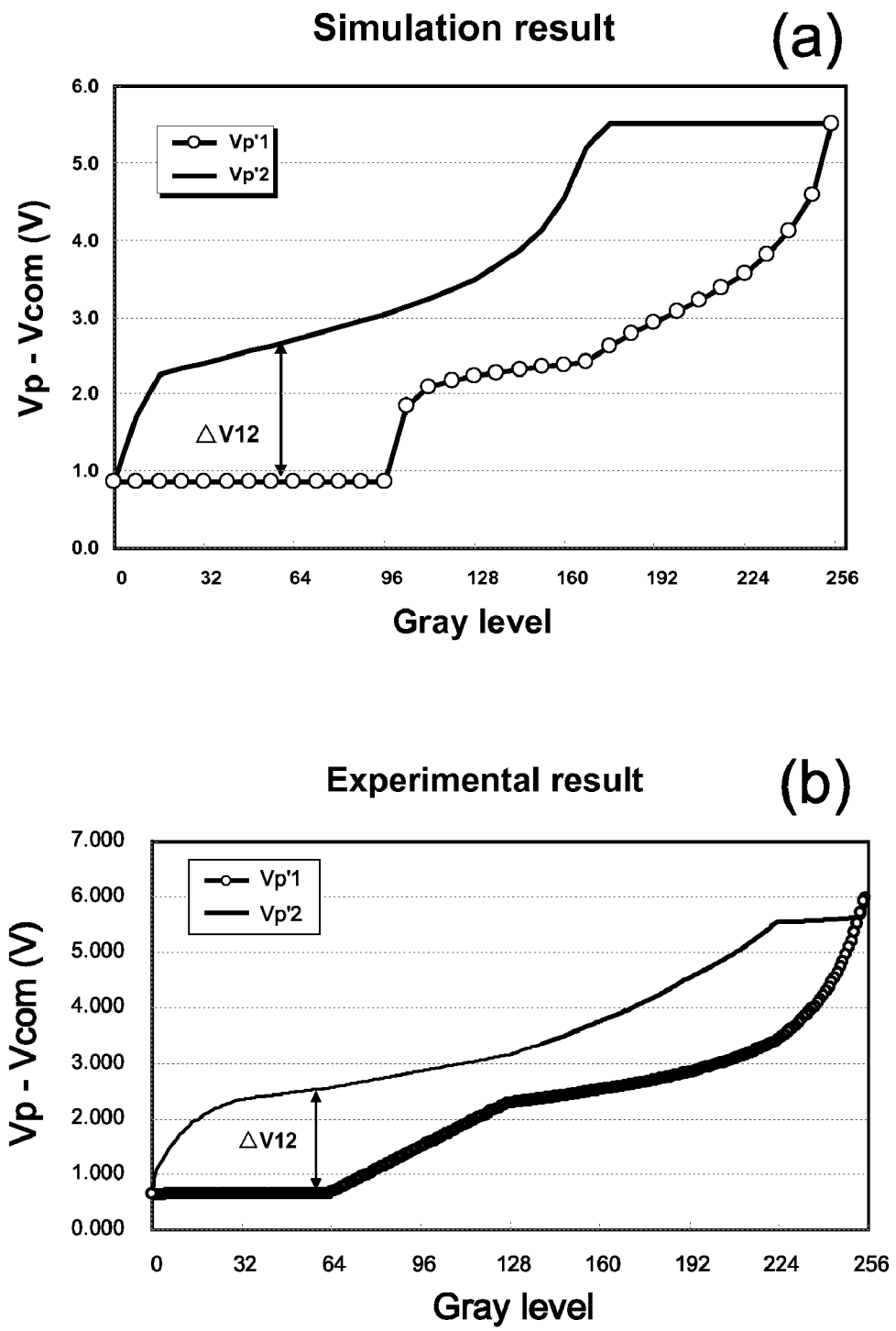
FIG. 6 shows the relationship of voltages of the first and second sub-pixel electrodes of a pixel of an LCD panel and the grey level for an image to be displayed on the pixel of the LCD panel according to one embodiment of the present invention, (a) a simulation result, and (b) an experimental result.
Figure 7:
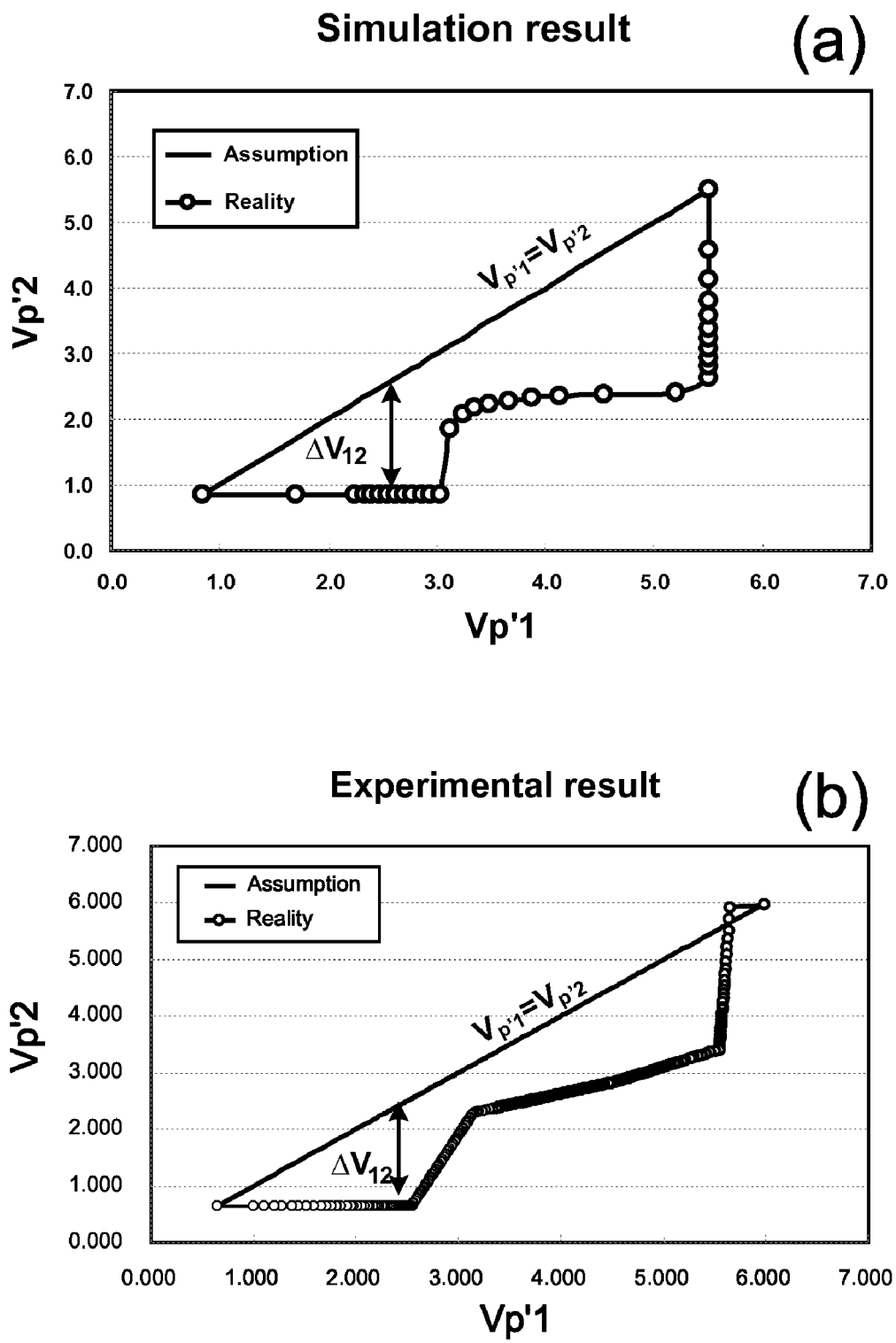
FIG. 7 shows the relationship of voltages of the first and second sub-pixel electrodes of the pixel of the LCD panel according to the embodiment of the present invention in FIG. 6, (a) a simulation result, and (b) an experimental result.

Referring to FIG. 6, the simulation and experimental results for the voltages Vp1 and Vp2 of the first and second sub-pixel electrodes of a pixel of an LCD panel against the grey level for an image to be displayed on the pixel of the LCD panel are shown according to one embodiment of the present invention, where the area ratio of A1/A2=1/1.6, and the grey level is expressed in an 8 bit. In FIG. 6, Vp'1=(Vp1−Vcom), and Vp'2=(Vp2−Vcom), where Vcom is the voltage applied to the common electrode. The voltage difference in the first and second sub-pixel electrodes of the pixel is ΔV12=(Vp'2−Vp'1)=(Vp2−Vp1). FIG. 7 shows the simulation and experimental results for the voltages Vp1 and Vp2 of the first and second sub-pixel electrodes of the pixel of the LCD panel according to the embodiment of the present invention in FIG. 6. In this embodiment, the first sub-pixel electrode has a lower voltage and a larger area, comprising with those of the sub-pixel electrode.

Figure 8:
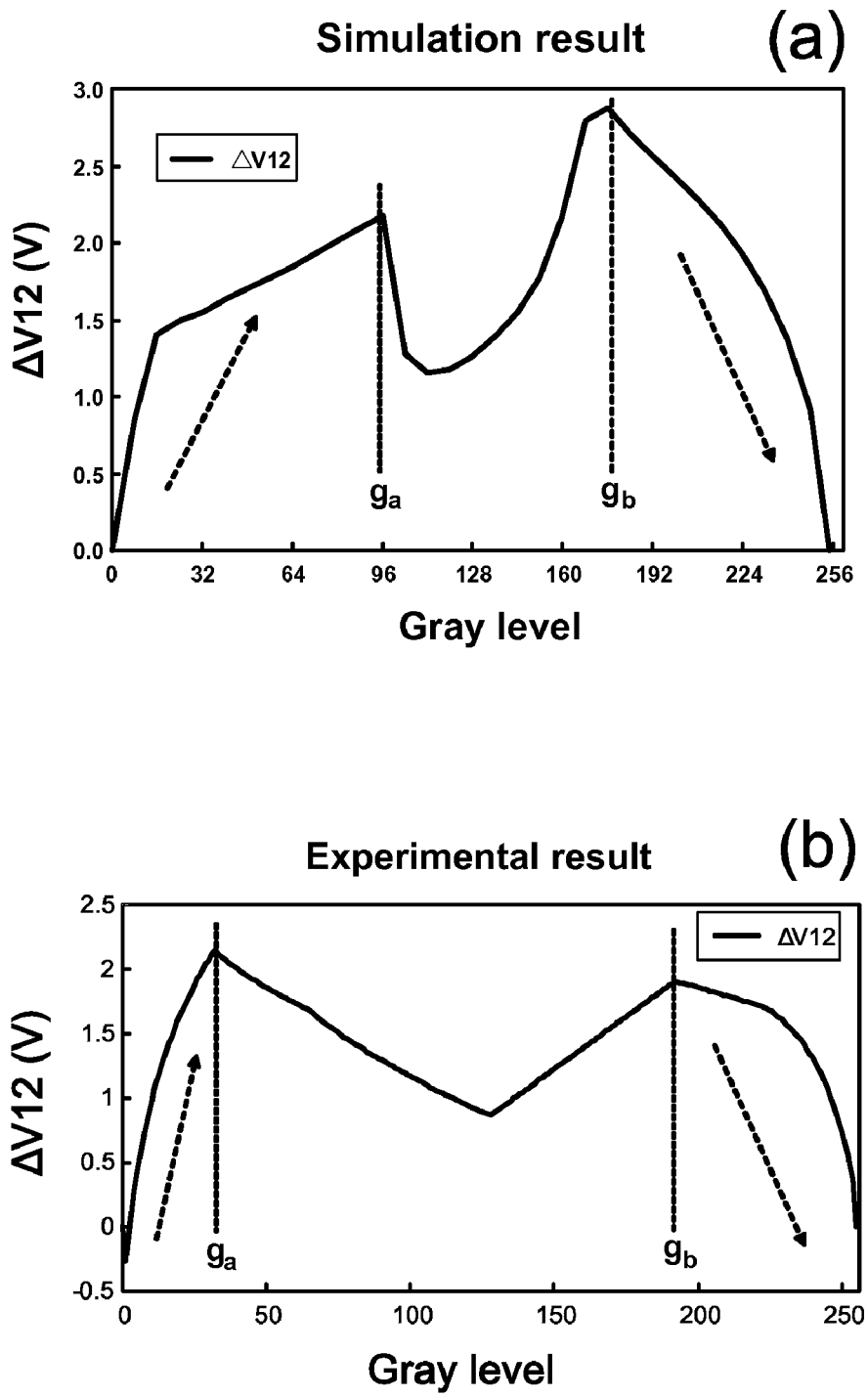
FIG. 8 shows the relationship of the voltage difference in the first and second sub-pixel electrodes of the pixel of the LCD panel and the grey level for an image to be displayed on the pixel of the LCD panel according to the embodiment of the present invention in FIG. 6, (a) a simulation result, and (b) an experimental result.

Accordingly, the voltage difference ΔV12 in the first and second sub-pixel electrodes of the pixel varies with the grey level, as shown in FIG. 8. When the grey level g increases from 0 to $g_a$, the voltage difference ΔV12 increases, i.e., $\Delta V12(g) < \Delta V12(g+1)$, for $0 \leq g \leq g_a$, while the voltage difference ΔV12 decreases as the grey level g increases from $g_b$ to R=255, i.e., $\Delta V_{12}(g) > \Delta V_{12}(g+1)$ for $g_b \leq g \leq R$. Both $g_a$ and $g_b$ that is larger than $g_a$ are larger than zero but less than R, and may vary with the characteristic of the liquid crystals and the area ratio of the first sub-pixel electrode to the second sub-pixel electrode.

Figure 9:
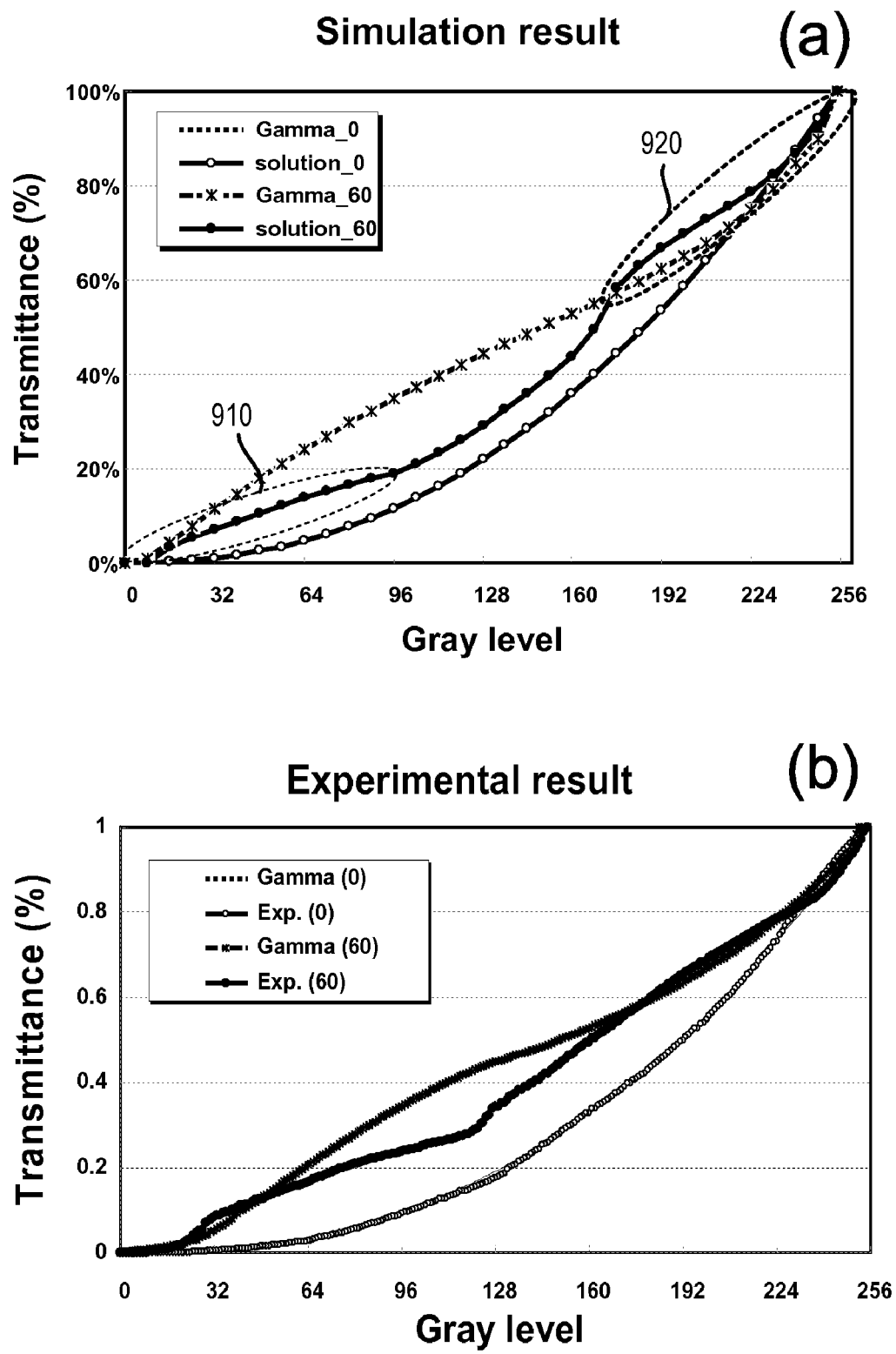
FIG. 9 shows the gamma curve the LCD panel according to the embodiment of the present invention in FIG. 6, (a) a simulation result, and (b) an experimental result.

FIG. 9 shows the simulation and experimental results of the gamma curve of the LCD panel, where Gamma_0 is set to be 2.4 and the first sub-pixel electrode has a lower voltage and a larger area, comprising with those of the sub-pixel electrode. For the simulation of the gamma curve, as shown in FIG. 9a, the area ratio of A1/A2=1/1.6, while the area ratio of A1/A2=1/1.2 for the experiment result of the gamma curve, as shown in FIG. 9b. In the simulation of the gamma curve, the driving signals are configured such that when the grey level g is in the range of 0-96, the first sub-pixel transmits no light, or a little amount of light, where the gamma curve in this range of the grey level is indicated by reference numeral 910, while the first sub-pixel transmits a large amount of light when the grey level g is greater than 96. Furthermore, when the grey level g is in the range of 176-255, the second sub-pixel transmits the most amount of light, where the gamma curve in this range of the grey level is indicated by reference numeral 920. The brightness of the second sub-pixel is reduced for g<176.

Figure 10:
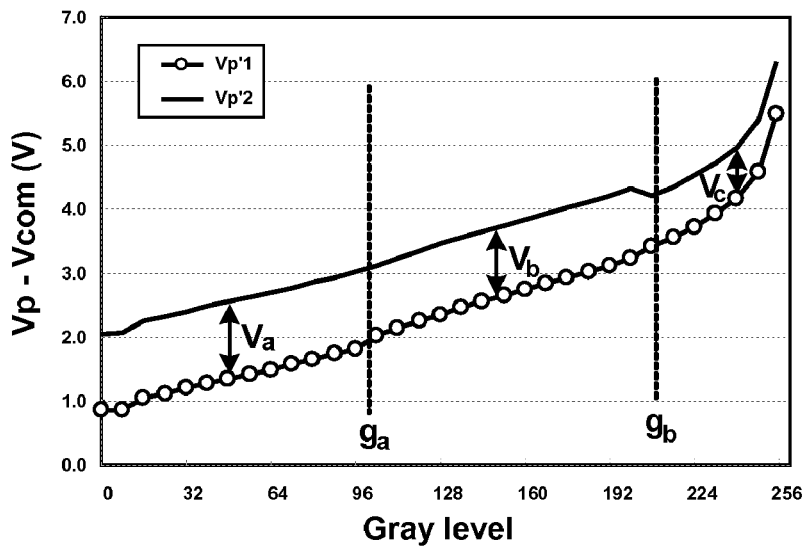
FIG. 10 shows a simulation result of the relationship of voltages of the first and second sub-pixel electrodes of a pixel of an LCD panel and the grey level for an image to be displayed on the pixel of the LCD panel according to one embodiment of the present invention.
Figure 11:
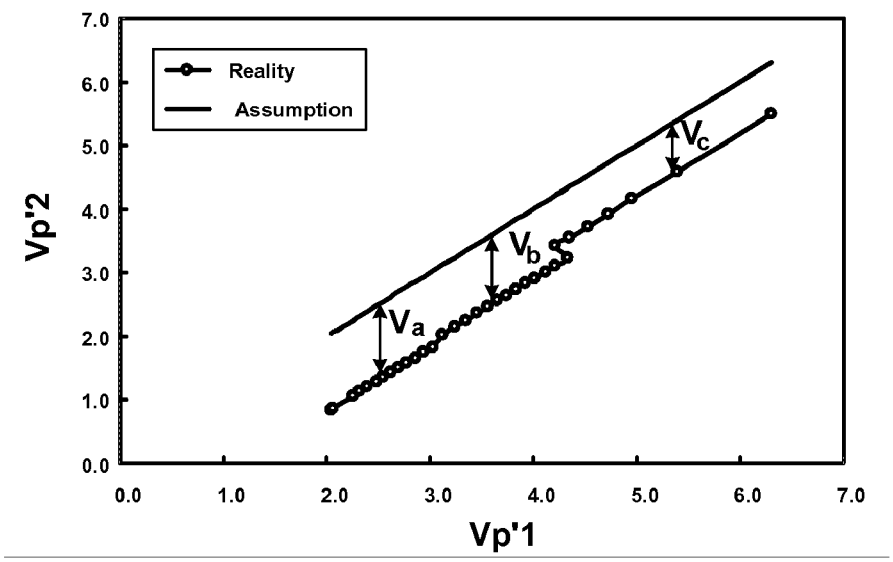
FIG. 11 shows a simulation result of the relationship of voltages of the first and second sub-pixel electrodes of the pixel of the LCD panel according to the embodiment of the present invention in FIG. 10.
Figure 12:
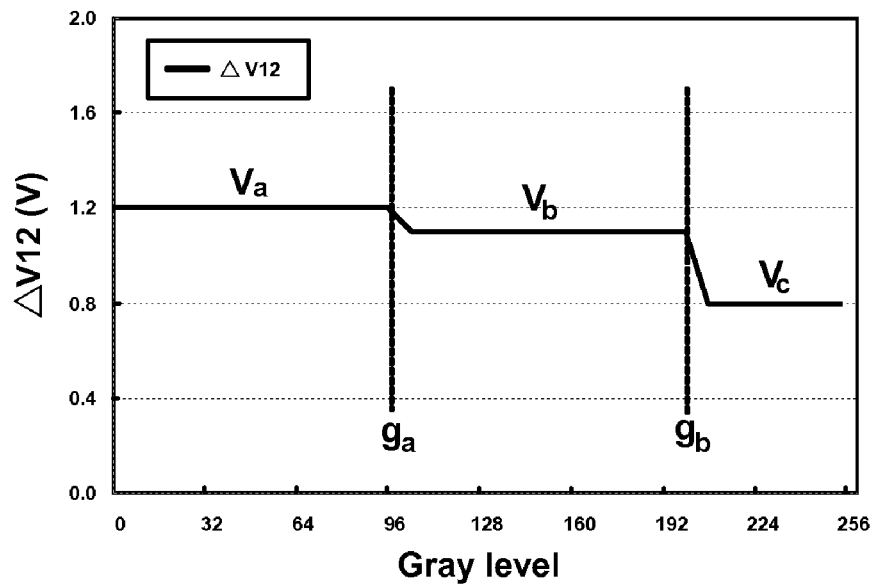
FIG. 12 shows a simulation result of the relationship of the voltage difference in the first and second sub-pixel electrodes of the pixel of the LCD panel and the grey level for an image to be displayed on the pixel of the LCD panel according to the embodiment of the present invention in FIG. 10.
Figure 13:
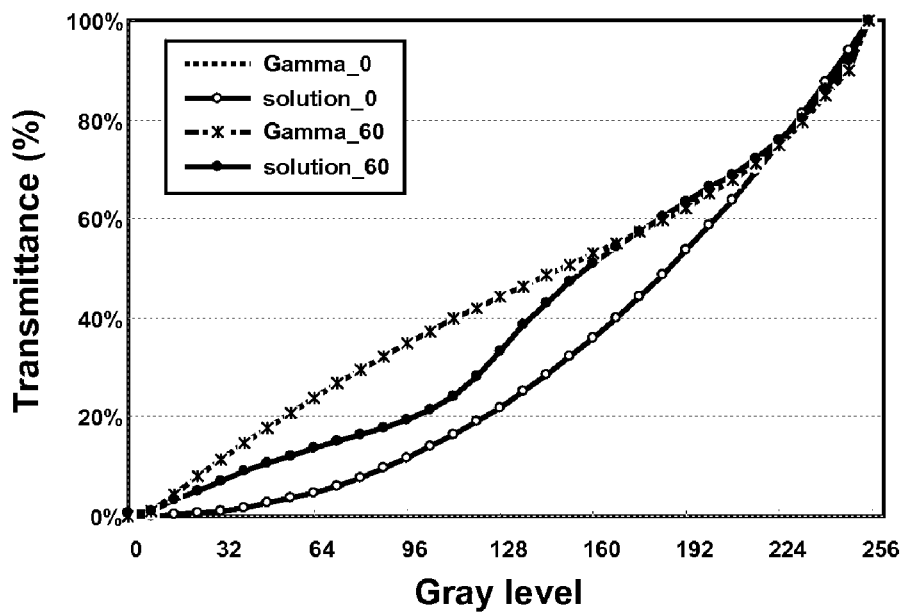
FIG. 13 shows a simulation result of the gamma curve the LCD panel according to the embodiment of the present invention in FIG. 10.

FIGS. 10 and 12 respectively show the simulation result for the voltages Vp1 and Vp2 of the first and second sub-pixel electrodes of a pixel of an LCD panel and its voltage difference ΔV12=(Vp2−Vp1) against the grey level for an image to be displayed on the pixel of the LCD panel are shown according to another embodiment of the present invention. It is clear that the voltage difference ΔV12 in the first and second electrodes of a pixel varies with the grey level g. In this embodiment, $\Delta V_{12}(g) = V_a$ for $0 \leq g \leq g_a$, $\Delta V_{12}(g) = V_b$ for $g_a \leq g \leq g_b$, and $\Delta V_{12}(g) = V_c$ for $g_b \leq g \leq R = 255$, where $V_a = 1.2V$, $V_b = 1.1V$ and $V_c = 0.8V$. FIG. 11 shows the simulation for the voltages Vp1 and Vp2 of the first and second sub-pixel electrodes of the pixel of the LCD panel. FIG. 13 shows the simulation of the gamma curve of the LCD panel.

One aspect of the present invention provides a method of improving color washout of an LCD device. In one embodiment, the method includes the step of providing an LCD panel having a plurality of pixels, $\{P_{n,m}\}$, spatially arranged in the form of a matrix, n=1, 2, . . . , N, and m=1, 2, . . . , M, and N, M being an integer greater than zero. Each pixel $P_{n,m}$ has at least a first sub-pixel, $P_{n,m}(1)$, having a sub-pixel electrode and a second sub-pixel, $P_{n,m}(2)$, having a sub-pixel electrode, The method also includes the step of applying a plurality of driving signals to the LCD panel so as to generate potential difference, $\Delta V_{12}(g)$, in the sub-pixel electrodes of the first and second sub-pixels of each pixel, respectively, which varies with a gray level g of an image to be displayed on the pixel, where g=0, 1, 2, . . . , R corresponding to one of the shades of grey of the image expressed in h bits, h being an integer greater than zero and $R=(2^h-1)$.

In one embodiment, the potential difference $\Delta V_{12}(g)$ generated in the sub-pixel electrodes of the first and second sub-pixels of a pixel varies with the gray level g, such that (i) when the gray level g is in the range from 0 to $g_a$, the potential difference $\Delta V_{12}(g)$ for the gray level g is less than the potential difference $\Delta V_{12}(g+1)$ for the gray level (g+1); and (ii) when the gray level g is in the range from $g_b$ to R, the potential difference $\Delta V_{12}(g)$ for the gray level g is greater than the potential difference $\Delta V_{12}(g+1)$ for the gray level (g+1), where $0 < g_a \leq g_b < R$, $g_a$ and $g_b$ each being an integer greater than zero.

In another embodiment, the potential difference $\Delta V_{12}(g)$ varies with the gray level g, such that (i) when the gray level g is in the range from 0 to $g_a$, the potential difference $\Delta V_{12}(g)$ for the gray level g has a constant voltage, $V_a$; (ii) when the gray level g is in the range from $g_a$ to $g_b$, the potential difference $\Delta V_{12}(g)$ for the gray level g has a constant voltage, $V_b$; and (iii) when the gray level g is in the range from $g_b$ to R, the potential difference $\Delta V_{12}(g)$ for the gray level g has a constant voltage, $V_c$, where $V_a > V_b > V_c$.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD) panel, comprising:
   a. a common electrode;
   b. a plurality of scanning lines, $\{G_n\}$, n=1, 2, . . . , N, spatially arranged along a row direction;
   c. a plurality of data lines, $\{D_m\}$, m=1, 2, . . . , M, spatially arranged crossing the plurality of scanning lines $\{G_n\}$ along a column direction perpendicular to the row direction; and
   d. a plurality of pixels, $\{P_{n,m}\}$, spatially arranged in the form of a matrix, each pixel $P_{n,m}$ defined between two neighboring scanning lines $G_n$ and $G_{n+1}$ and two neighboring data lines $D_m$ and $D_{m+1}$, and comprising at least a first sub-pixel, $P_{n,m}(1)$, and a second sub-pixel, $P_{n,m}(2)$, wherein each of the first sub-pixel $P_{n,m}(1)$ and the second sub-pixel $P_{n,m}(2)$ comprises a sub-pixel electrode, a liquid crystal (LC) capacitor and a storage capacitor both electrically connected between the sub-pixel electrode and the common electrode in parallel, and a transistor having a gate electrically connected to the scanning line $G_n$, a source electrically connected to the sub-pixel electrode and a drain, and wherein the drain of the transistor of the first sub-pixel $P_{n,m}(1)$ of the pixel $P_{n,m}$ is electrically connected to the data line $D_m$, and the drain of the transistor of the second sub-pixel $P_{n,m}(2)$ of the pixel $P_{n,m}$ is electrically connected to the sub-pixel electrode of the first sub-pixel $P_{k,m}(1)$ of the pixel $P_{k,m}$, or wherein the drain of the transistor of the second sub-pixel $P_{n,m}(2)$ of the pixel $P_{n,m}$ is electrically connected to the data line $D_m$, and the drain of the transistor of the first sub-pixel $P_{n,m}(1)$ of the pixel $P_{n,m}$ is electrically connected to the sub-pixel electrode of the second sub-pixel $P_{k,m}(2)$ of the pixel $P_{k,m}$, wherein $k=1, 2, \ldots, N$, and $k \neq n$, wherein when a scanning signal is applied to a scanning line $G_a$ to turn on the corresponding transistors connected to the scanning line $G_n$, a plurality of data signals is simultaneously applied to the plurality of data lines $\{D_n\}$, respectively, so as to charge the corresponding LC capacitors and storage capacitors of each pixel of the corresponding pixel row for aligning states of corresponding liquid crystal cells associated with the pixel row to control light transmittance therethrough.

2. The LCD panel of claim 1, wherein the plurality of data signals comprises a plurality of gray level voltages, each gray level voltage being associated with a gray level, g, of an image to be displayed on a pixel in the pixel row such that when the gray level voltage is applied the pixel, a potential difference, $\Delta V_{12}(g)$, is generated in the sub-pixel electrodes of the first and second sub-pixels of the pixel, which varies with the gray level g of the image to be displayed on the pixel, wherein $g=0, 1, 2, \ldots, R$ corresponding to one of the shades of grey of the image expressed in h bits, h being an integer greater than zero and $R=(2^h-1)$.

3. The LCD panel of claim 2, wherein
 a. when the gray level g is in the range from 0 to $g_a$, the potential difference $\Delta V_{12}(g)$ for the gray level g is less than the potential difference $\Delta V_{12}(g+1)$ for the gray level (g+1); and
 b. when the gray level g is in the range from $g_b$ to R, the potential difference $\Delta V_{12}(g)$ for the gray level g is greater than the potential difference $\Delta V_{12}(g+1)$ for the gray level (g+1),
 wherein $0 < g_a \leq g_b < R$, $g_a$ and $g_b$ each being an integer greater than zero.

4. The LCD panel of claim 2, wherein
 a. when the gray level g is in the range from 0 to $g_a$, the potential difference $\Delta V_{12}(g)$ for the gray level g has a constant voltage, $V_a$;
 b. when the gray level g is in the range from $g_a$ to $g_b$, the potential difference $\Delta V_{12}(g)$ for the gray level g has a constant voltage, $V_b$; and
 c. when the gray level g is in the range from $g_b$ to R, the potential difference $\Delta V_{12}(g)$ for the gray level g has a constant voltage, $V_c$,
 wherein $0 < g_a \leq g_b < R$, $g_a$ and $g_b$ each being an integer greater than zero, and
 wherein $V_a > V_b > V_c$.

5. The LCD panel of claim 1, wherein $k=n+1$ or $n-1$.

6. The LCD panel of claim 1, wherein the sub-pixel electrode of the first sub-pixel has an area A1, and the sub-pixel electrode of the second sub-pixel has an area A2, and wherein the ratio of A1/A2 is in a range of about 0.2-5.0.

7. A method of driving a liquid crystal display (LCD) with color washout improvement, comprising the steps of:
 a. providing an LCD panel comprising:
  (i). a common electrode;
  (ii). a plurality of scanning lines, $\{G\}$, $n=1, 2, \ldots, N$, spatially arranged along a row direction;
  (iii). a plurality of data lines, $\{D_m\}$, $m=1, 2, \ldots, M$, spatially arranged crossing the plurality of scanning lines $\{G_n\}$ along a column direction perpendicular to the row direction; and
  (iv). a plurality of pixels, $\{P_{n,m}\}$, spatially arranged in the form of a matrix, each pixel $P_{n,m}$ defined between two neighboring scanning lines $G_n$ and $G_{n+1}$ and two neighboring data lines $D_m$ and $D_{m+1}$, and comprising at least a first sub-pixel, $P_{n,m}(1)$, and a second sub-pixel, $P_{n,m}(2)$, wherein each of the first sub-pixel $P_{n,m}(1)$ and the second sub-pixel $P_{n,m}(2)$ comprises a sub-pixel electrode, a liquid crystal (LC) capacitor and a storage capacitor both electrically connected between the sub-pixel electrode and the common electrode in parallel, and a transistor having a gate electrically connected to the scanning line $G_n$, a source electrically connected to the sub-pixel electrode and a drain, wherein the drain of the transistor of the first sub-pixel $P_{n,m}(a)$ of the pixel $P_{n,m}$ is electrically connected to the data line $D_m$, and the drain of the transistor of the second sub-pixel $P_{n,m}(2)$ of the pixel $P_{n,m}$ is electrically connected to the sub-pixel electrode of the first sub-pixel $P_{k,m}(1)$ of the pixel $P_{k,m}$, or wherein the drain of the transistor of the second sub-pixel $P_{n,m}(2)$ of the pixel $P_{n,m}$ is electrically connected to the data line $D_m$, and the drain of the transistor of the first sub-pixel $P_{n,m}(1)$ of the pixel $P_{n,m}$ is electrically connected to the sub-pixel electrode of the second sub-pixel $P_{k,m}(2)$ of the pixel $P_{k,m}$, wherein $k=1, 2, \ldots, N$, and $k \neq n$; and
 b. applying a plurality of driving signals to the LCD panel so as to generate a potential difference, $\Delta V_{12}(g)$, in the sub-pixel electrodes of the first and second sub-pixels of each pixel, respectively.

8. The method of claim 7, further comprising the step of generating the plurality of driving signals.

9. The method of claim 8, wherein the plurality of driving signals comprises a plurality of scanning signals sequentially applied to the plurality of scanning lines, a plurality of data signals simultaneously applied to the plurality of data lines, and a common signal applied to the common electrode, respectively.

10. The method of claim 9, wherein the plurality of data signals comprises a plurality of gray level voltages, each gray level voltage being associated with a gray level, g, of an image to be displayed on a pixel in the pixel row such that when the gray level voltage is applied the pixel, the potential difference $\Delta V_{12}(g)$ generated in the sub-pixel electrodes of the first and second sub-pixels of the pixel varies with the gray level g of the image to be displayed on the pixel, wherein $g=0, 1, 2, \ldots$, R corresponding to one of the shades of grey of the image expressed in h bits, h being an integer greater than zero and $R=(2^h-1)$.

11. The method of claim 10, wherein
 a. when the gray level g is in the range from 0 to $g_a$, the potential difference $\Delta V_{12}(g)$ for the gray level g is less than the potential difference $\Delta V_{12}(g+1)$ for the gray level (g+1); and b. when the gray level g is in the range from $g_b$ to R, the potential difference $\Delta V_{12}(g)$ for the gray level g is greater than the potential difference $\Delta V_{12}(g+1)$ for the gray level (g+1), wherein $0<g_a \leq g_b <R$, $g_a$ and $g_b$ each being an integer greater than zero.

12. The method of claim 10, wherein a. when the gray level g is in the range from 0 to $g_a$, the potential difference $\Delta V_{12}(g)$ for the gray level g has a constant voltage, $V_a$;

b. when the gray level g is in the range from $g_a$ to $g_b$, the potential difference $\Delta V_{12}(g)$ for the gray level g has a constant voltage, $V_b$; and c. when the gray level g is in the range from $g_b$ to R, the potential difference $\Delta V_{12}(g)$ for the gray level g has a constant voltage, $V_c$, wherein $0<g_a \leq g_b <R$, $g_a$ and $g_b$ each being an integer greater than zero, and wherein $V_a > V_b > V_c$.

13. A liquid crystal display (LCD) panel, comprising:

a. a plurality of pixels, $\{P_{n,m}\}$, spatially arranged in the form of a matrix, n=1, 2, ..., N, and m=1, 2, ..., M, and N, M being an integer greater than zero, each pixel $P_{n,m}$ comprising at least a first sub-pixel, $P_{n,m}(1)$, having a sub-pixel electrode, and a second sub-pixel, $P_{n,m}(2)$, having a sub-pixel electrode, wherein the plurality of pixels $\{P_{n,m}\}$ is configured such that when a gray level voltage associated with a gray level, g, of an image to be displayed on a pixel $P_{n,m}$ is applied to the pixel $P_{n,m}$, a potential difference, $\Delta V_{12}(g)$, is generated in the sub-pixel electrodes of the first and second sub-pixels of the pixel $P_{n,m}$, and varies with the gray level g, such that (i). when the gray level g is in the range from 0 to $g_a$, the potential difference $\Delta V_{12}(g)$ for the gray level g is less than the potential difference $\Delta V_{12}(g+1)$ for the gray level (g+1); and (ii). when the gray level g is in the range from $g_b$ to R, the potential difference $\Delta V_{12}(g)$ for the gray level g is greater than the potential difference $\Delta V_{12}(g+1)$ for the gray level (g+1), wherein g=0, 1, 2, ..., R corresponding to one of the shades of grey of the image expressed in h bits, h being an integer greater than zero and R=($2^h$−1), and wherein $0<g_a \leq g_b <R$, $g_a$ and $g_b$ each being an integer greater than zero.

14. The LCD panel of claim 13, further comprising:

a. a common electrode;

b. a plurality of scanning lines, $\{G_n\}$, n=1, 2, ..., N, spatially arranged along a row direction; and c. a plurality of data lines, $\{D_m\}$, m=1, 2, ..., M, spatially arranged crossing the plurality of scanning lines $\{G_n\}$ along a column direction perpendicular to the row direction, wherein each pixel $P_{n,m}$ of the plurality of pixels $\{P_{n,m}\}$ is defined between two neighboring scanning lines $G_n$ and $G_{n+1}$ and two neighboring data lines $D_m$ and $D_{m+1}$.

15. The LCD panel of claim 14, wherein each of the first sub-pixel $P_{n,m}(1)$ and the second sub-pixel $P_{n,m}(2)$ of each pixel $P_{n,m}$ further comprises a liquid crystal (LC) capacitor and a storage capacitor both electrically connected between the sub-pixel electrode and the common electrode in parallel, and a transistor having a gate electrically connected to the scanning line $G_n$, a source electrically connected to the sub-pixel electrode and a drain.

16. The LCD panel of claim 15, wherein the drain of the transistor of the first sub-pixel $P_{n,m}(1)$ of the pixel $P_{n,m}$ is electrically connected to the data line $D_m$, and the drain of the transistor of the second sub-pixel $P_{n,m}(2)$ of the pixel $P_{n,m}$ is electrically connected to the sub-pixel electrode of the first sub-pixel $P_{k,m}(1)$ of the pixel $P_{k,m}$, wherein k=1, 2, ..., N, and k≠n.

17. The LCD panel of claim 15, wherein the drain of the transistor of the second sub-pixel $P_{n,m}(2)$ of the pixel $P_{n,m}$ is electrically connected to the data line $D_m$, and the drain of the transistor of the first sub-pixel $P_{n,m}(1)$ of the pixel $P_{n,m}$ is electrically connected to the sub-pixel electrode of the second sub-pixel $P_{k,m}(2)$ of the pixel $P_{k,m}$, wherein k=1, 2, ..., N, and k≠n.

18. A liquid crystal display (LCD) panel, comprising:

a. a plurality of pixels, $\{P_{n,m}\}$, spatially arranged in the form of a matrix, n=1, 2, ..., N, and m=1, 2, ..., M, and N, M being an integer greater than zero, each pixel $P_{n,m}$ comprising at least a first sub-pixel, $P_{n,m}(1)$, having a sub-pixel electrode and a second sub-pixel, $P_{n,m}(2)$, having a sub-pixel electrode, wherein the plurality of pixels $\{P_{n,m}\}$ is configured such that when a gray level voltage associated with a gray level, g, of an image to be displayed on a pixel is applied to the pixel $P_{n,m}$, a potential difference, $\Delta V_{12}(g)$, is generated in the sub-pixel electrodes of the first and second sub-pixels of the pixel $P_{n,m}$, and varies with the gray level g, such that (i). when the gray level g is in the range from 0 to $g_a$, the potential difference $\Delta V_{12}(g)$ for the gray level g has a constant voltage, $V_a$;

(ii). when the gray level g is in the range from $g_a$ to $g_b$, the potential difference $\Delta V_{12}(g)$ for the gray level g has a constant voltage, $V_b$; and (iii). when the gray level g is in the range from $g_b$ to R, the potential difference $\Delta V_{12}(g)$ for the gray level g has a constant voltage, $V_c$, wherein g=0, 1, 2, ..., R corresponding to one of the shades of grey of the image expressed in h bits, h being an integer greater than zero and R=($2^h$−1), wherein $0<g_a \leq g_b <R$, $g_a$ and $g_b$ each being an integer greater than zero, and wherein $V_a > V_b > V_c$.

19. A liquid crystal display (LCD) panel, comprising:

a. a plurality of pixels, $\{P_{n,m}\}$, spatially arranged in the form of a matrix, n=1, 2, ..., N, and m=1, 2, ..., M, and N, M being an integer greater than zero, each pixel $P_{n,m}$ comprising at least a first sub-pixel, $P_{n,m}(1)$, having a sub-pixel electrode, and a second sub-pixel, $P_{n,m}(2)$, having a sub-pixel electrode, wherein the plurality of pixels, $\{P_{n,m}\}$, is configured such that when a gray level voltage associated with a gray level, g, of an image to be displayed on a pixel is applied to the pixel $P_{n,m}$, a potential difference, $\Delta V_{12}(g)$, is generated in the sub-pixel electrodes of the first and second sub-pixels of the pixel $P_{n,m}$, which varies with the gray level g of the image to be displayed on the pixel, wherein g=0, 1, 2, ..., R corresponding to one of the shades of grey of the image expressed in h bits, h being an integer greater than zero and R=($2^h$−1).

20. The LCD panel of claim 19, wherein a. when $0 \leq g \leq g_a$, $\Delta V_{12}(g) < \Delta V_{12}(g+1)$; and b. when $g_b \leq g \leq R$, $\Delta V_{12}(g) > \Delta V_{12}(g+1)$, wherein $0<g_a \leq g_b <R$, $g_a$ and $g_b$ each being an integer greater than zero.

21. The LCD panel of claim 19, wherein a. when $0 \leq g \leq g_a$, $\Delta V_{12}(g) = V_a$;

b. when $g_a \leq g \leq g_b$, $\Delta V_{12}(g) = V_b$; and c. when $g_b \leq g \leq R$, $\Delta V_{12}(g) = V_c$, wherein $0 < g_a \leq g_b < R$, $g_a$ and $g_b$ each being an integer greater than zero, and wherein $V_a$, $V_b$ and $V_c$ are constant voltages with $V_a > V_b > V_c$.

22. A method of driving a liquid crystal display (LCD) with color washout improvement, comprising the steps of:

a. providing an LCD panel comprising a plurality of pixels, $\{P_{n,m}\}$, spatially arranged in the form of a matrix, $n=1, 2, \ldots, N$, and $m=1, 2, \ldots, M$, and N, M being an integer greater than zero, each pixel $P_{n,m}$ comprising at least a first sub-pixel, $P_{n,m}(1)$, having a sub-pixel electrode, and a second sub-pixel, $P_{n,m}(2)$, having a sub-pixel electrode; and b. applying a plurality of driving signals to the LCD panel so as to generate potential difference, $\Delta V_{12}(g)$, in the sub-pixel electrodes of the first and second sub-pixels of each pixel, respectively, which varies with a gray level g of an image to be displayed on the pixel, wherein $g=0, 1, 2, \ldots, R$ corresponding to one of the shades of grey of the image expressed in h bits, h being an integer greater than zero and $R=(2^h-1)$.

23. The method of claim 22, wherein b. when $0 \leq g \leq g_a$, $\Delta V_{12}(g) < \Delta V_{12}(g+1)$; and
c. when $g_b \leq g \leq R$, $\Delta V_{12}(g) > \Delta V_{12}(g+1)$, wherein $0 < g_a \leq g_b < R$, $g_a$ and $g_b$ each being an integer greater than zero.

24. The method of claim 22, wherein a. when $0 \leq g \leq g_a$, $\Delta V_{12}(g) = V_a$;
b. when $g_a \leq g \leq g_b$, $\Delta V_{12}(g) = V_b$; and
c. when $g_b \leq g \leq R$, $\Delta V_{12}(g) = V_c$, wherein $0 < g_a \leq g_b < R$, $g_a$ and $g_b$ each being an integer greater than zero, and wherein $V_a$, $V_b$ and $V_c$ are constant voltages with $V_a > V_b > V_c$.

25. The method of claim 22, further comprising the step of generating the plurality of driving signals.

* * * * *